United States Patent

Okamoto et al.

[11] Patent Number: 5,959,803
[45] Date of Patent: Sep. 28, 1999

[54] CARTRIDGE CHANGER, DATA STORAGE UNIT USING THE CHANGER AND APPARATUS USING THE DATA STORAGE UNIT

[75] Inventors: Tomomi Okamoto, Chigasaki; Nobuyuki Kaku, Oiso-machi, both of Japan

[73] Assignee: Hitachi, Ltd., Tokyo, Japan

[21] Appl. No.: 08/891,981

[22] Filed: Jul. 11, 1997

[30] Foreign Application Priority Data

Jul. 12, 1996 [JP] Japan ................................ 8-183078

[51] Int. Cl.$^6$ .......................... G11B 15/68; G11B 17/22
[52] U.S. Cl. .................... 360/92; 369/36; 369/178
[58] Field of Search .................. 360/92; 369/34–38, 369/178, 191–194

[56] References Cited

U.S. PATENT DOCUMENTS

| | | | |
|---|---|---|---|
| 3,578,336 | 5/1971 | Ban | 360/92 |
| 3,599,986 | 8/1971 | Ban | 360/92 |
| 3,599,987 | 8/1971 | Ban | 360/92 |
| 5,502,697 | 3/1996 | Taki | 369/34 |
| 5,607,275 | 3/1997 | Woodruff et al. | 414/331 |

FOREIGN PATENT DOCUMENTS

| | | |
|---|---|---|
| 0569636 | 11/1993 | European Pat. Off. |
| 0601247 | 6/1994 | European Pat. Off. |
| 2-009058 | 1/1990 | Japan |
| 3-023553 | 1/1991 | Japan |
| 620363 | 1/1994 | Japan |
| 6-131788 | 5/1994 | Japan |

*Primary Examiner*—William J. Klimowicz
*Attorney, Agent, or Firm*—Antonelli, Terry, Stout & Kraus, LLP

[57] ABSTRACT

A cartridge changer having a predetermined width across a predetermined rotational plane, includes a rack being rotatable and storing at least first and second cartridges in a predetermined rotational plane, wherein at least one distance extending across the first and second cartridges in the predetermined rotational plane and through a rotational axis of the rack is greater than the predetermined width of the cartridge changer, and a rotator for rotating the rack in the predetermined rotational plane, so as to exchange a position of the first and second cartridges within the rotational plane without exceeding the predetermined width of the cartridge changer. The rotator more specifically performs a combination of rotation and shifting of the first and second cartridges with respect to one another within the rotational plane to accomplish exchange of the first and second cartridges within the rotational plane without exceeding the predetermined width of the cartridge changer. The shifting is more specifically linear displacement of the first and second cartridges in a direction parallel to a diameter defined in the predetermined rotational plane and through the rotational axis of the rack, and wherein an amount of linear displacement of the first and second cartridges at any given point of rotation is dependent on an amount of angular displacement of the rack from a predetermined position.

77 Claims, 17 Drawing Sheets

$\theta=0°$ $0°<\theta<90°$ $\theta=90°$

Linear displacement of racks

Angular displacement of rack unit(°)

Angular displacement of the rack unit (°)

CARTRIDGE CHANGER, DATA STORAGE UNIT USING THE CHANGER AND APPARATUS USING THE DATA STORAGE UNIT

BACKGROUND OF THE INVENTION

1. Field of the Invention

The present invention relates to a compact cartridge changer capable of automatically changing, within a limited space, a plurality of cartridges of recording medium (e.g., magnetic tapes, etc.) disposed on an opposing rack, further relates to a data storage unit using such changer and including additional support components (e.g., a player, amplifiers, etc.), and still further, relates to an apparatus (e.g., computer, VTR, etc.) using such data storage unit.

2. Description of Related Art

A magnetic tape drive of a cartridge change type is capable of automatically changing a fully recorded cartridge tape for an empty cartridge tape by a cartridge changer when a quantity of data to be accessed and/or recorded is too large with respect to a single cartridge tape. FIG. 13 shows such a possible cartridge changer 1 having a recording-and-reproducing tape drive 2 disposed therein, and a rack unit 3 for storing cartridges is disposed above the recording-and-reproducing tape drive. A cartridge conveying unit 5 for extracting and conveying a cartridge is disposed in front of (i.e., to face a cartridge input port of) the recording-and-reproducing tape drive and the rack unit, such cartridge conveying unit 5 being constructed to convey a selected cartridge (e.g., 4a, 4b) between the rack unit and the recording-and-reproducing tape drive 2, i.e., convey in a vertical direction V and a horizontal direction H.

The rack unit 3 has a first rack 3a disposed opposite to the cartridge conveying unit 5 and containing cartridges 4a, and a second rack 3b disposed behind the first rack and containing cartridges 4b, i.e., such configuration represents opposing racks. The arrangement of the rack unit 3, having first and second racks 3a, 3b and cartridges stored therein is hereinafter called a "rack system". Since the cartridge conveying unit 5 is able to take out a cartridge only from a rack disposed opposite thereto (i.e., facing) the cartridge conveying unit, the rack unit 3 must be able to rotate R the first and second rack 3a, 3b through an angle of 180° about a turning axis 13 substantially corresponding to the center of the rack unit, in order to allow access to and extraction/insertion of a cartridge 4b from the second rack. FIGS. 14a–14d are schematic plan views of the cartridge changer. The cartridge changer carries out operations illustrated in FIGS. 14a–14d to shift the first rack 3a from a front position opposite the cartridge conveying unit to a back position, and to shift the second rack 3b from the back position to the front position, to enable the cartridge conveying unit 5 to gain access to and extract/insert a cartridge from the second rack.

With respect to the turning operation of FIGS. 14a–14d, it is noted that typically there are limitations on an amount of space which is available to effect a turning operation of the rack in order to avoid contacting interference between parts of the turning rack system and other physical obstruction (e.g., walls or other objects). More particularly, within FIGS. 14a–14d, there is illustrated a constraint perimeter 50 representing an area within which the turning operation must be effected. For example, constraint perimeter 50 may be defined by the enclosed casing walls of a cartridge changer 1 (FIGS. 14a–14d) or data storage unit 102 (FIG. 16), or may be defined by other walls or other physical obstructions if a cartridge changer or data storage unit does not have an enclosed casing and is installed within an apparatus (100; FIG. 16), e.g., if a data storage unit 102 without an enclosed casing is installed within a drive bay 101 of a computer 100, the drive bay walls may define the clearance perimeter 50. Other types of physical objects may also represent obstructions.

Related to this discussion is also a turning periphery 60 as illustrated in FIGS. 14a–14d. More particularly, within such Figs. there is a turning periphery 60 representing the extent or path of an outermost portion (defined by a maximum distance across, width or diameter 70) of the rack system, as such rack system is rotated R about the turning axis 13. It can clearly be seen that the turning periphery 60 is within the clearance perimeter 50, and thus there is no interference problem associated with a turning of the rack system in FIGS. 14a–14d. Accordingly, from the above discussions and associated illustrations, it can be seen that a clearance of a clearance perimeter 50 must be greater than a turning periphery 60 defined by rotating a maximum width or diameter 70 of the rack system, in order to be able to rotate R the rack unit without special accommodations.

Discussion now turns to a mathematical analysis of the above discussion, and also discussion as to a disadvantaged arrangement having interference with obstructions. More particularly, suppose that in FIG. 15c each of the cartridges stored in the racks (not illustrated in FIG. 15c) have a width h and a depth b, and that a maximum width or diameter 70 of a most outwardly extending portion across the rack system (and through the turning axis 13) is defined as having a width "m". In FIG. 15c, illustrated minimum available or necessary distances from the center axis 13 of the cartridge changer to the closest inner surfaces of clearance periphery 50 (e.g., the opposite side panels) of the casing of the cartridge conveying unit are B+B', which (in the FIG. 15c illustration) are greater than both the width h and the maximum width m. In a rectangular rack system arrangement such as that shown in FIG. 15c and FIGS. 14a–14d, when the rack system is turned, the distance B+B' which is adequate for non-interference with the clearance perimeter 50, and which is related to the width h and depth b, is expressed by the expression:

$$B + B' > \sqrt{h^2 + 4b^2} \tag{1a}$$

Stated more generally, if a maximum distance (e.g., diameter) m extending through the turning axis 13 and across the most widely extending portions (e.g., diagonal) of the rack system is defined as line 70 (FIGS. 15a–15c) having a dimension "m", then in order to be a non-interfering arrangement:

$$B+B'>m \tag{1b}$$

If this width is not available, the edges of the cartridge will collide with obstructions defining the clearance perimeter 50 (e.g., the side panels of the casing of the cartridge changer) and the rack unit is unable to turn as illustrated in FIGS. 15b.

Accordingly, if a limited space (i.e., clearance perimeter 50) exists for a cartridge changer arrangement where B+B'<m, an opposing rack system cannot be turned within the clearance perimeter 50.

SUMMARY OF THE INVENTION

An object of the present invention is to provide a unique and novel arrangement having special accommodations which allow the turning of an opposing rack system in a limited space situation (i.e., clearance perimeter 50) where B+B'<m, i.e., allow turning in an arrangement where a maximum distance m extending through a changer turning axis and across a most widely extending rack system portion exceeds a minimum available distance B+B' between closest inner surfaces of a clearance periphery.

A more specific object of the present invention is to provide, in a rectangular rack system when the distances B and B' in a cartridge changer meet:

$$B + B' < \sqrt{h^2 + 4b^2} \quad (2)$$

a mechanism capable of interchanging the positions of the first and the second rack of a rack unit in a turning operation within the limited space B+B', without contacting or exceeding a clearance perimeter 50.

In order to accomplish the above objects, when a rack unit is rotated R about turning axis 13, a first and a second rack are capable of being shifted within a rotation plane so as to vary a distance (i.e., width or diameter) of any rack system portion approaching or confronting the clearance perimeter, to allow adequate non-contacting clearance between such portions of rack system and the clearance perimeter, i.e., the first and the second racks are linearly displaced with respect to each other in the rotation plane, preferably equally and oppositely to each other with respect to the turning axis 13.

Another specific object of the present invention is to provide a cartridge changer arrangement where respective linear displacements of the first and the second rack vary according to an angular displacement of the rack from a predetermined position, as the rack rotates. With regard to the such object, in one preferred arrangement, the respective linear displacements $X(\theta)$ of the first and the second rack are expressed by:

$$X(\theta) = -X(180° - \theta) \quad (3)$$

$$X(\theta) = X(180° + \theta) \quad (4)$$

where $\theta$ is an angular displacement of the rack unit.

In another preferred embodiment, the cartridge changer meets a condition expressed by:

$$X(\theta) = A \sin(2\theta) \quad (5)$$

where $\theta$ is an angular displacement of the rack unit, $X(\theta)$ is the respective linear displacements of the first and the second rack, and A is a constant.

With respect to linear displacement, in one arrangement a fixed gear is disposed under the turning center 13 of the rack unit, two rotating pinions having ½ a number of teeth as the teeth of the fixed gear are disposed in engagement with the fixed gear, a cam is attached to each of the rotating pinions, the respective positions of the first and the second rack correspond to the positions of the cams, respectively, and the rotating pinions rotate about their own axis and revolve about the axis of turning of the rack unit when the rack unit is turned. As the first and second racks 3a, 3b interact with the cams, the first and second racks 3a, 3b are linearly displaced in equal but opposite directions as rack rotation occurs.

As another arrangement a fixed gear is disposed under the center of turning of the rack unit, two rotating pinions having ½ the number of teeth as the teeth of the fixed gear are disposed in engagement with the fixed gear, the rotating pinions have eccentric guide portions for guiding the first and the second rack for movement lying off to the side from their centers, and the rotating pinions rotate about their own axis and revolve about the axis of turning of the rack unit when the rack unit is turned. Again the first and second racks 3a, 3b are linearly displaced in equal but opposite directions.

As an even further alternative arrangement, the fixed gear and the rotating pinions may be replaced with a fixed roller and rotating rollers, for example, wherein such fixed/rotating rollers preferably satisfy a relationship $d_1 = 2 \times d_2$, where $d_1$ is the diameter of the fixed roller and $d_2$ is the diameter of the rotating rollers.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments at the time the patent application was filed in order to teach one skilled in the art to make and use the invention, it should be clearly understood that the same is by way of illustration and example only and is not to be taken by way of limitation, the spirit and scope of the present invention being limited only by the terms of the appended claims.

BRIEF DESCRIPTION OF THE DRAWINGS

The following represents brief descriptions of the drawings, wherein.

DETAILED DESCRIPTION OF THE PREFERRED EMBODIMENTS OF THE INVENTION

Figure 1A:
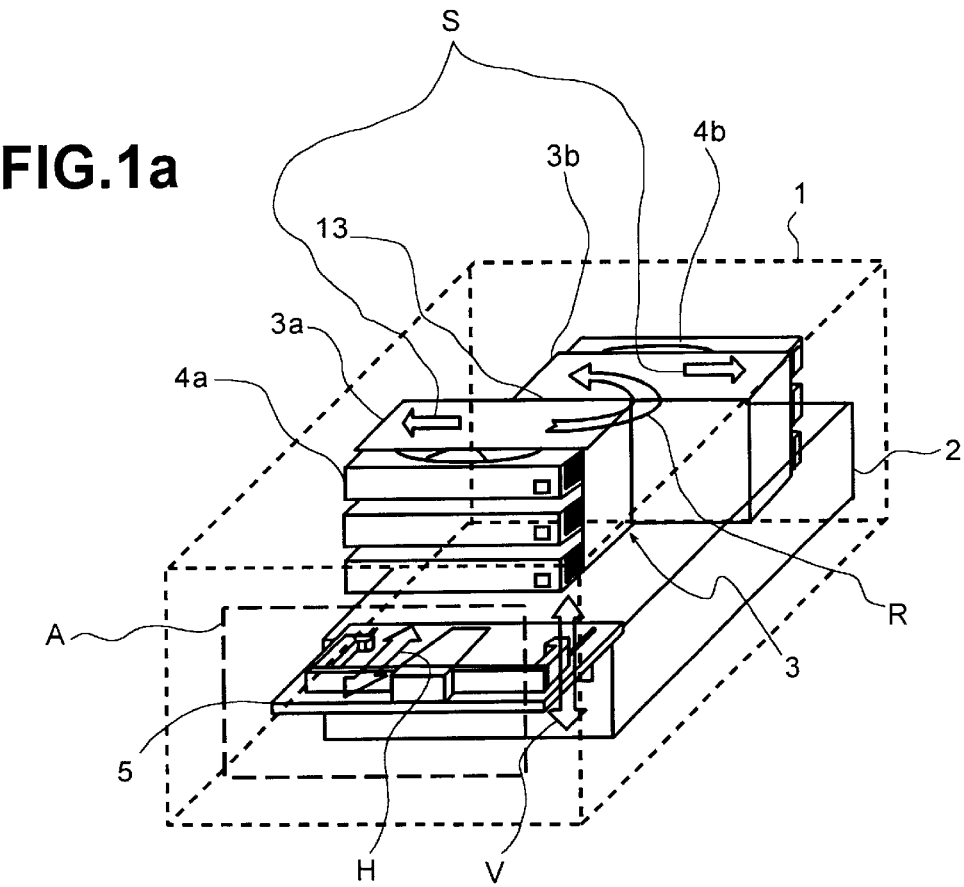
FIGS. 1a–1b are a schematic perspective and plan views of a cartridge changer in a first embodiment according to the present invention.

Before beginning a detailed description of the subject invention, mention of the following is in order:

When appropriate, like reference numerals and characters are used to designate identical, corresponding or similar components in differing figure drawings.

The figure drawings associated with this disclosure typically are not drawn with dimensional accuracy or to scale, i.e., such drawings have been drafted with a focus on clarity of viewing and understanding rather than dimensional accuracy. An attempt has been made specifically to point out any dimensions, tolerances, etc. which are important.

Figure 16:
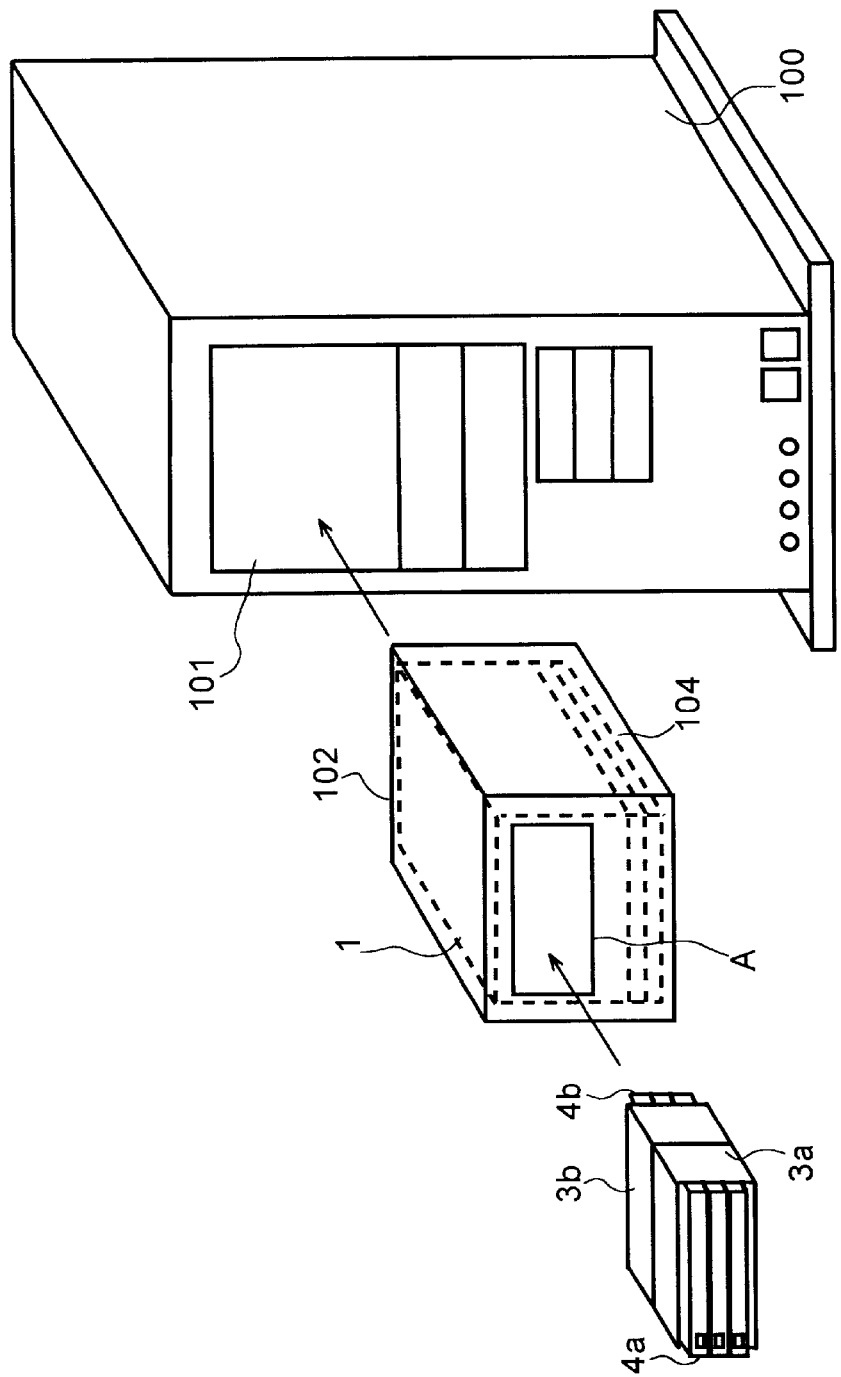
FIG. 16 is a perspective view illustrating the relationship between the cartridge changer, the data storage unit and an apparatus.

Preferred embodiments of the present invention will be described hereinafter with reference to FIGS. 1 to 12. FIG. 1a is a schematic perspective view of a cartridge changer 1 arrangement in a preferred embodiment according to the present invention. A recording-and-reproducing tape drive 2 is disposed inside the cartridge changer 1, and a rack unit 3 for storing cartridges is disposed above the recording-and-reproducing tape drive 2. The rack unit 3 has a first rack 3a and a second rack 3b. Cartridges 4a and cartridges 4b are stored in the first rack 3a and the second rack 3b, respectively, with their side walls along which tapes travel facing each other (i.e., having access windows or doors of the cartridges facing each other). A cartridge access port A is shown by a dashed area, a purpose of such cartridge access port is to allow extraction/replacement of cartridges in/out of the cartridge changer 1. The cartridge access port A may be an opening within an outer casing of the cartridge changer 1 and/or an opening within an outer casing of a data storage unit 102 as illustrated in FIG. 16, and may or may not have a protective door. The cartridge access arrangement of the present invention may have a construction for extraction/replacement of cartridges in/out of the cartridge changer by extracting/replacing one cartridge at a time, or alternatively by extracting/replacing the entire rack system.

A cartridge conveying unit 5 is disposed in front of the rack unit 3 and the recording-and-reproducing tape drive 2 to transfer a selected cartridge between the recording-and-reproducing tape drive 2 and the rack unit 3. The cartridge conveying unit includes appropriate components such as gears (circular and linear toothed), rollers, pinions, cams, springs, grooves, stops, motor (stepper), controller and cartridge grabber (vacuum, mechanical, etc.) which (responsive to appropriate control signals): allows it to move in a vertical direction V so as to move a cartridge to any rack cartridge level, drive level or access port level; allows it to move in a horizontal direction H so as to extract/replace any of the cartridges in/out of any rack cartridge level or drive level; and further, moves in the horizontal direction H so as to eject/load either individual cartridges or the entire rack system with respect to the cartridge access port A.

In a preferred embodiment, the cartridge conveying unit has a cartridge holder for holding one cartridge, a guide member for guiding the movement of the cartridge holder, and a driving motor for driving the cartridge holder along a guide portion (e.g., groove, track, restricting path, etc.) provided in the guide member. At a time of loading of a cartridge, the cartridge holder takes out a selected cartridge from the rack unit and conveys it to the drive so as to deliver it to a predetermined position. At unloading from the drive, the cartridge holder takes out the drive-mounted cartridge, again conveys it along the guide portion (but in an opposite direction to loading), and returns it to the rack unit (FIG. 1a). Exemplary loading/unloading constructions/arrangements can be seen in JP6-20363, EP 0 569 636 A1 and EP 0 601 247 A1, the teachings of which are incorporated herein by reference.

With regard to ejection from the access port A, in a preferred embodiment, a rack conveying unit has (similar to the cartridge conveying unit) a rack holding arrangement, a rack guide member with a rack guide portion (groove, track, restricting path, etc.) and a rack driving motor for driving the rack along the rack guide portion to be moved between a rack eject position and a rack normal position. More particularly, suitable rack ejecting/loading constructions/arrangements can be constructed similarly to a front loading mechanism of a tape cassette apparatus or conventional VCR apparatus, e.g., such an apparatus which employs a rack system.

Figure 1B:
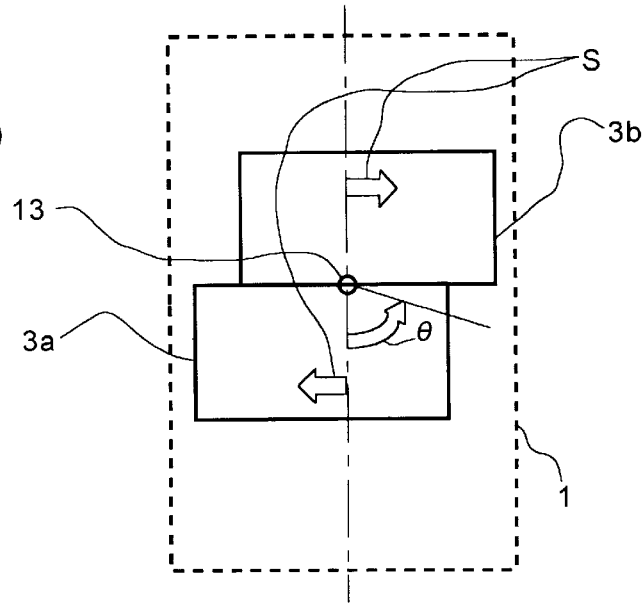

The cartridge conveying unit 5 is able to take out the cartridge only from the first rack 3a when the first rack 3a is disposed opposite thereto or only from the second rack 3b when the second rack 3b is disposed opposite thereto. If it is desired to take out the cartridge from the rack (the first rack 3a or the second rack 3b) not currently facing on the side of the cartridge conveying unit 5, the rack unit 3 must be rotated R through an angle of 180° around a turning axis 13 substantially coinciding with the center axis of the rack unit 3 as shown in FIG. 1b, to move a rack storing the desired cartridge (the first rack 3a or the second rack 3b) to face the cartridge conveying unit 5. The rack unit 3 can be turned through an angle θ (FIG. 1b) about the turning axis 13, and the first rack 3a and the second rack 3b are able to move (i.e., be temporarily displaced) in the linear displacement directions of the directions S which are parallel to a rotational plane for rotating the first rack 3a and the second rack 3b. Actions of the first rack 3a and the second rack 3b during the turning of the rack unit 3 will be described with reference to FIGS. 2a–2e.

Figure 2A:
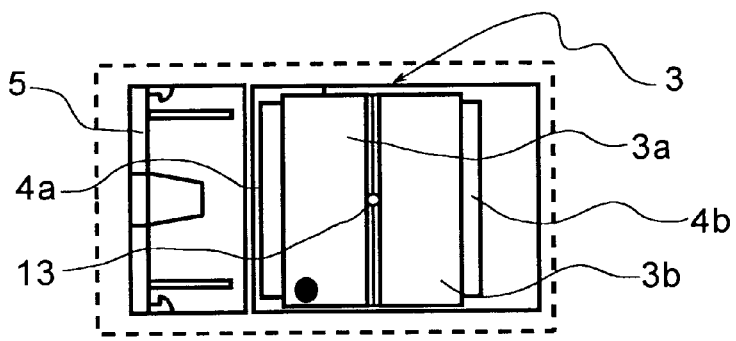
FIGS. 2a–2e are schematic plan views showing the cartridge changer of FIG. 1 in different phases of an operation for turning a rack system.
Figure 2B:
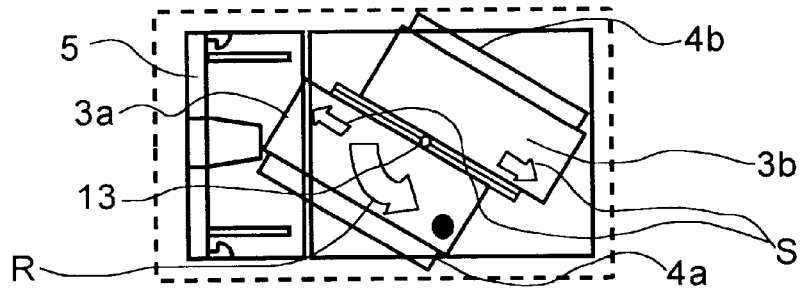
Figure 2C:
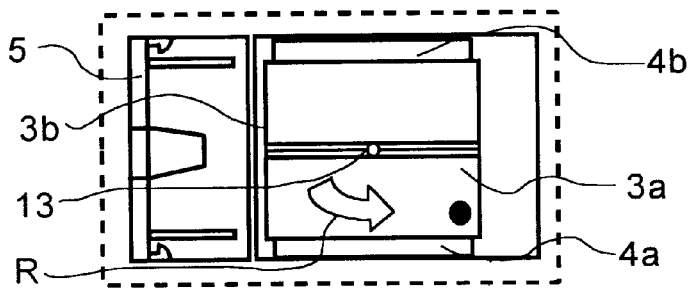

In FIG. 2a, the first rack 3a storing the cartridges 4a faces the side of the cartridge conveying unit 5. Suppose that it is desired to take out the cartridge 4b stored in the second rack 3b and thus it is necessary to rotate R the rack unit 3 from a position shown in FIG. 2a to a position shown in FIG. 2e. In order to accommodate/accomplish such turning, the rack unit 3 is rotated R about the turning axis 13 during a first phase of rotation, while appropriately shifting the first rack 3a and the second rack 3b in first directions S, respectively, as shown in FIG. 2b. With respect to the maximum width 70 and turning periphery 60 mentioned above in the background discussion, at this point in discussion, it is useful to further specify the related concepts of original maximum width, confronting width, and non-confronting width and also original periphery, confronting periphery and non-confronting periphery.

Figure 17:
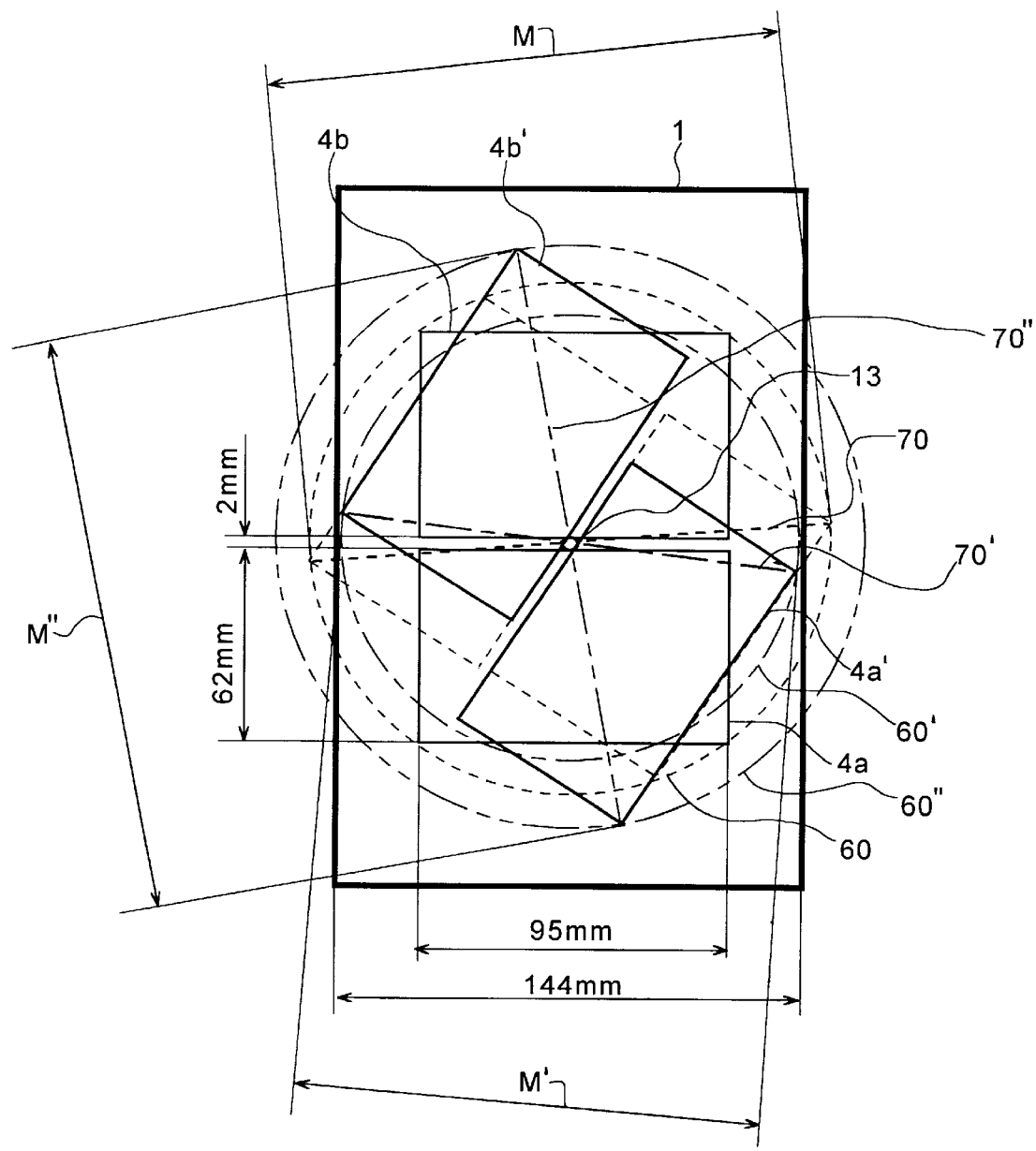
FIG. 17 is a diagrammatic view useful in explaining width changes caused by rack shifting of a cartridge changer embodying the present invention.

More particularly, referencing FIG. 17, if the rack unit 3 is turned without shifting the first rack 3a and the second rack 3b, such arrangement would have an original maximum width 70 (of dimension m) with an original periphery 60 which exceeds the perimeter of the cartridge changer 1, such that the corners of the cartridges 4a and 4b would run against the side panels of the casing of the cartridge changer 1 and the rack unit 3 would be unable to turn (i.e., would jam). In contrast, if, during a first phase of rotation, the first rack 3a and the second rack 3b are shifted as shown in FIG. 2b so as to provide a reduced confronting width 70' (of dimension m') with a reduced confronting periphery 60' which did not exceed the perimeter of the cartridge changer 1, confronting corners of the rack system (i.e., a rack width approaching near and confronting the cartridge changer perimeter) are able to clear the perimeter (e.g., walls) of the cartridge changer 1 so as to continue rotating R. Note also in FIG. 17 that shifting of the first and second racks 3a, 3b also results in an expanded non-confronting width 70" (of dimension m") with an expanded non-confronting periphery 60" which would greatly exceed the narrow perimeter portions of the cartridge changer 1. However, since such expanded non-confronting width 70" exists in a direction similar to a longitudinal axis of the cartridge changer, such non-confronting width 70" is well within the wide perimeter potions of the cartridge changer 1, and thus do not pose a problem.

Figure 2D:
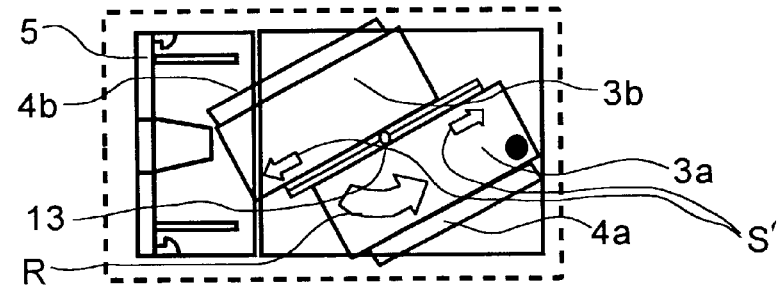
Figure 2E:
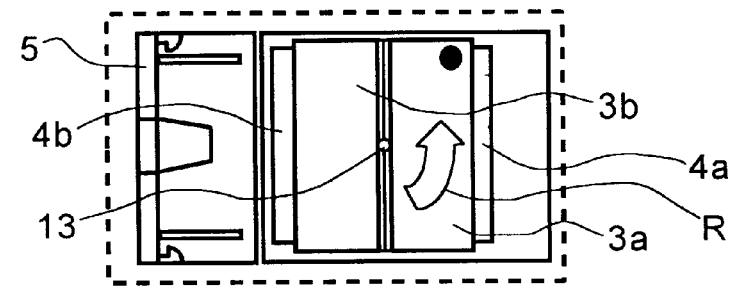

Returning to the FIGS. 2a–2e discussions, FIG. 2c shows the rack unit 3 after the rack unit 3 has been turned about the axis 13 of turning through an angle of 90° from the position shown in FIG. 2a. In this state, the respective displacements of the first rack 3a and the second rack 3b from their original positions are eliminated, and the racks are returned to the original opposing positions 0. FIG. 2d shows the rack unit 3 after the rack unit 3 has been turned about the axis 13 of turning through an angle greater than 90° but not greater than 180° (from the position shown in FIG. 2a). In the state shown in FIG. 2d, the first rack 3a and the second rack 3b are shifted in directions S' reverse to the directions S in which the same were shifted in the state shown in FIG. 2b so as to prevent differing confronting corners of the cartridges 4a and 4b from running against the side panels of the casing of the cartridge changer 1. Finally, the rack unit 3 is turned about the turning axis 13 through an angle of 180° (from its original FIG. 2a position) to a position shown in FIG. 2e. In the state shown in FIG. 2e, the respective displacements of the first rack 3a and the second rack 3b from their original positions are 0, and the second rack 3b is now disposed opposite to the cartridge conveying unit 5. Thus, from the above descriptions, it can be seen that the first rack 3a and the second rack 3b are appropriately shifted from their original positions at proper timings according to the angular displacement of the rack unit 3 to prevent the cartridges 4a and 4b stored on the racks 3a and 3b from running against the side panels of the casing of the cartridge changer 1 during the turning of the rack unit 3.

Figure 3A:
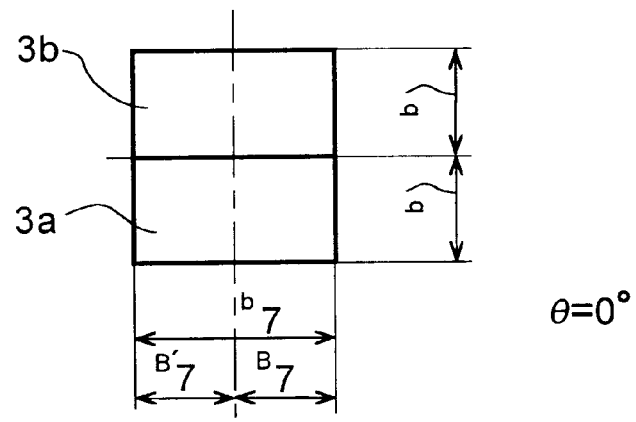
FIG. 3a–3c are diagrammatic views showing dimensional variables of the cartridge changer of FIG. 1.
Figure 3B:
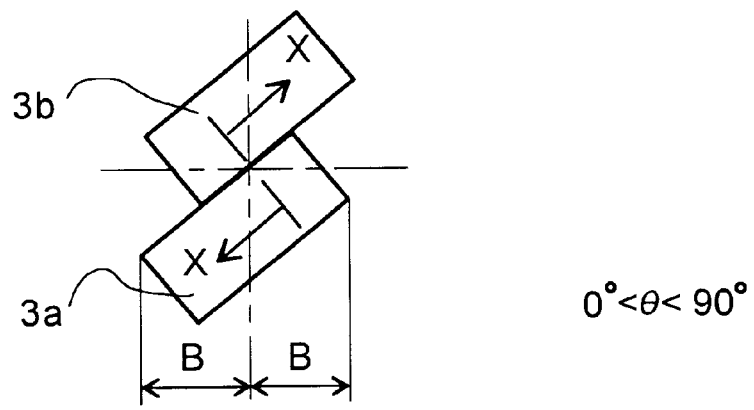
Figure 3C:
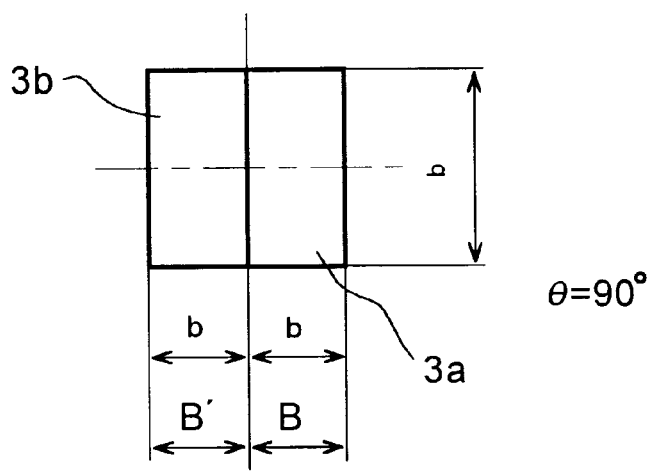

The relation between the angular displacement θ of the rack unit 3, the linear displacements X of the first rack 3a and the second rack 3b, and peripheral clearance distances B and B' from the center axis of the cartridge changer 1 to the (narrowest) side panels of the casing, will now be described with reference to FIGS. 3a–3c and 4. Shown in FIGS. 3a–3c are the first rack 3a and the second rack 3b of the rack unit 3 storing cartridges (not shown for simplicity). Suppose that the first rack 3a and the second rack 3b storing cartridges each have a width h and a depth b. In FIGS. 3a–3c, rotation within the ranges of θ=0°, 0°<θ<90° and θ=90° are shown, respectively. As the rack unit 3 having the first rack 3a and the second rack 3b has a point-symmetrical shape, the linear displacement X for the angular displacement in the range of 180°≦θ≦360° is equal to that for the angular displacement in the range of 0°≦θ≦180°, and the linear displacement X' for the angular displacement in the range of 90°≦θ≦180° is equal in absolute value and reverse in direction to that for the angular displacement X in the range of 0°≦θ≦90°. Accordingly, only the relation within the range of 0°≦θ≦90° need be explained. Therefore, it is necessary to determine only the relation between the angular displacement θ of the rack unit 3, the linear displacements X of the first rack 3a and the second rack 3b, and the necessary distances B and B' from the center axis of the cartridge changer 1 to the side panels, for the angular displacement range of 0°≦θ≦90°.

As is obvious from FIG. 3a, necessary distances B, B'=h/2 when the rack unit 3 is positioned at an angular displacement θ=0°. (Condition 1)

As is obvious from FIG. 3b, necessary distances B and B' are expressed by the following expressions when the angular displacement is in the range of 0°<θ<90°.

$$B = \sqrt{\left(\frac{h}{2} - x\right)^2 + b^2} \cdot \cos\varphi \qquad (6)$$

and where $$\varphi = \frac{\pi}{2} - \Theta - \tan^{-1}\left(\frac{\frac{h}{2} - x}{b}\right) \qquad (7)$$

$$B' = \left(\frac{h}{2} + x\right) \cdot \cos\Theta$$

When the angular displacement θ of the rack unit 3 is in the range expressed by 0°<θ<90°, B and B' are minimum when B=B'. (Condition 2)

When the rack unit 3 is at θ=90°, B and B'=b as shown in FIG. 3c. (Condition 3)

Maximum values of B and B' among those meeting Conditions 1, 2 and 3 correspond to the necessary width of the cartridge changer 1.

Continuing discussion, FIG. 16 is a perspective view illustrating the relationship between the cartridge changer, the data storage unit and an apparatus. More particularly, one main application of the cartridge changer 1 is within a data storage unit 102. More specifically, in such application, the data storage unit 102 could be a computing data backup unit, and the cartridges 4a, 4b can be magnetic tape cartridges used for the computing data backup unit within a computing system, wherein such backup unit would conveniently include six magnetic tape cartridges (e.g., one magnetic tape cartridge for backup on each Monday through Friday business day, and one spare magnetic tape cartridge for emergencies). The data storage unit typically will contain additional supportive components 104 other than the cartridge changer 1, e.g., a battery, additional circuitry, a microprocessor, a memory, etc. The data storage unit 102, in turn, could be installed within a larger apparatus, e.g., the computer system 100 of FIG. 16. Of course, the cartridge changer of the present invention is equally applicable within other types of applications, data storage units and apparatus.

Further, the present invention is meant to allow design of many differing cartridge changers for use with many different types of cartridges types and sizes, such differing cartridges changers further being meant for use within limited space areas pertaining to standardized space sizes. More specifically, the teachings of the present disclosure can be used to design cartridge changers for the handling of any of the following cartridge types: a 6.3 mm magnetic tape cartridge defined in "HD Digital VCR Conference", (December, 1994), having a cartridge width of 66.2 mm (±0.21), length of 48 mm (±0.3), and height of 12.2 mm (±0.2); a (Hitachi original) 8 mm wide magnetic tape cartridge defined in "ECMA Standardizing Information And Communication Systems, ECMA/TC17/96/14", having a cartridge width of 95.0 mm (±0.2), length of 62.5 mm (±0.3), and height of 15.0 mm (±0.2); a (Sony original) 8 mm wide magnetic tape cartridge (AIT-1 Format) defined in "ECMA Standardizing Information And Communication Systems, ECMA/TC17/96/63", (Aug. 29, 1996), having a cartridge width of 95.0 mm (±0.2), length of 62.5 mm (±0.3), and height of 15.0 mm (±0.2); a (Exabite original) 8 mm wide magnetic tape cartridge defined in "European Computer Manufacturers Association, Standard ECMA-169", (August, 1992), having a cartridge width of 95.0 mm (±0.2), length of 62.5 mm (±0.3), and height of 15.0 (±0.2). The present invention is equally applicable to other types of magnetic tape cartridges, such as VCR cartridge tapes, 4 mm cartridge tapes, etc. Further, with regard to limited area sizes defined for standardized drives, the cartridge changer and/or data storage unit of the present invention is preferably designed for installation within a computer drive bay designed for a 5.25 inch floppy drive or a 3.5 inch floppy drive. With respect to the 5.25 inch floppy drive bay, a standardized narrow width thereof is substantially 146 mm, while a 3.5 inch floppy drive bay has a typical standardized narrow width of substantially 101 mm. The teachings of each of any above- or below-listed references are herein incorporated by reference.

In using the rack shifting arrangement and method of the present invention, a cartridge changer which previously could not be constructed to fit (i.e., without rack shifting) within a width allotted to a standardized 5.25 inch or 3.5 inch floppy drive bay, can now be constructed (i.e., thanks to rack shifting). More particularly, the discussion to follow details at least one such example, although dimensional values have been rounded where appropriate for simplicity.

Figure 4:
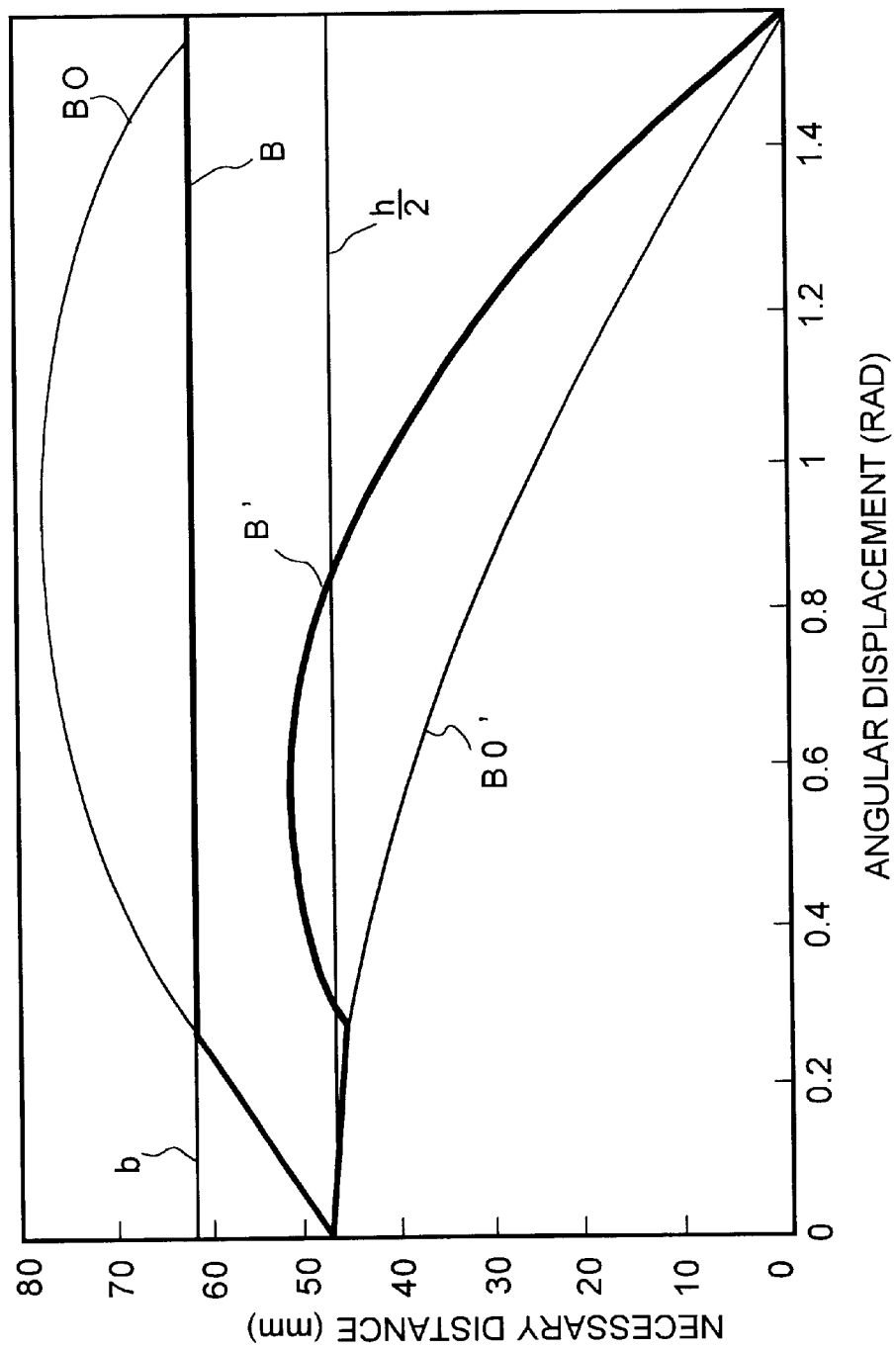
FIG. 4 is a graph showing relationships of necessary distances B, B', B0 and B1 with respect to angular displacement of a rack.

FIG. 4 is a graph showing the results of calculation made under the foregoing conditions and based on an assumption that h=95 mm and b=62 mm. B0 and B0' are curves indicating necessary distances when the racks 3a and 3b of the rack unit 3 are not linearly displaced. When the racks 3a and 3b of the rack unit 3 are not linearly displaced, the necessary distance B0 is about 78 mm. The necessary distances when the racks 3a and 3b are properly linearly displaced are indicated by curves B and B'. The necessary distance B increases with the increase of the angular displacement θ of the rack unit. However, the racks 3a and 3b need not be displaced linearly during an initial phase of rotation while B<b. When the necessary width B increases to meet B>b, Condition 2 applies and the first rack 3a and the second rack 3b are shifted linearly by an amount X so that B=B'. When B<b, the shifting X of the racks 3a and 3b may be stopped. Thus, when the rack unit is at an angular position in the range of 0°≦θ≦90°, the necessary distances B and B'=b=62 mm<78 mm. Accordingly, an original maximum width of 156 mm (i.e., 2 times 78 mm) of an 8 mm cartridge tape changer without shifting is too wide to be designed within the 146 mm standardized narrow width of a 5.25 inch floppy drive bay, whereas, a reduced confronting width of 124 mm (i.e., 2 times 62) of an 8 mm cartridge tape changer with shifting is sufficiently narrow to be designed within the 146 mm standardized narrow width of a 5.25 inch floppy drive bay. More particularly, as is clear from the above discussion, such 8 mm cartridge tape changer with shifting can fit within any area having a predetermined width within the range of 124 mm–146 mm. By designing such 8 mm cartridge to have a predetermined width of less than 146 mm (e.g., 124 mm), any unused width portion of the 146 mm standardized narrow width of a 5.25 inch floppy drive bay is efficiently available to house additional components (e.g., the additional components 104 of a data storage unit 102, described with respect to FIG. 16). Accordingly, the space saving advantage of the present invention can clearly be seen.

Similarly, when the cartridges have dimensions of h=73 mm and b=54 mm, the necessary distances B, B'=b=54 mm and, when the cartridges have dimensions of h=66 mm, b=43 mm, the necessary distances B and B'=b=43 mm.

Figure 5A:
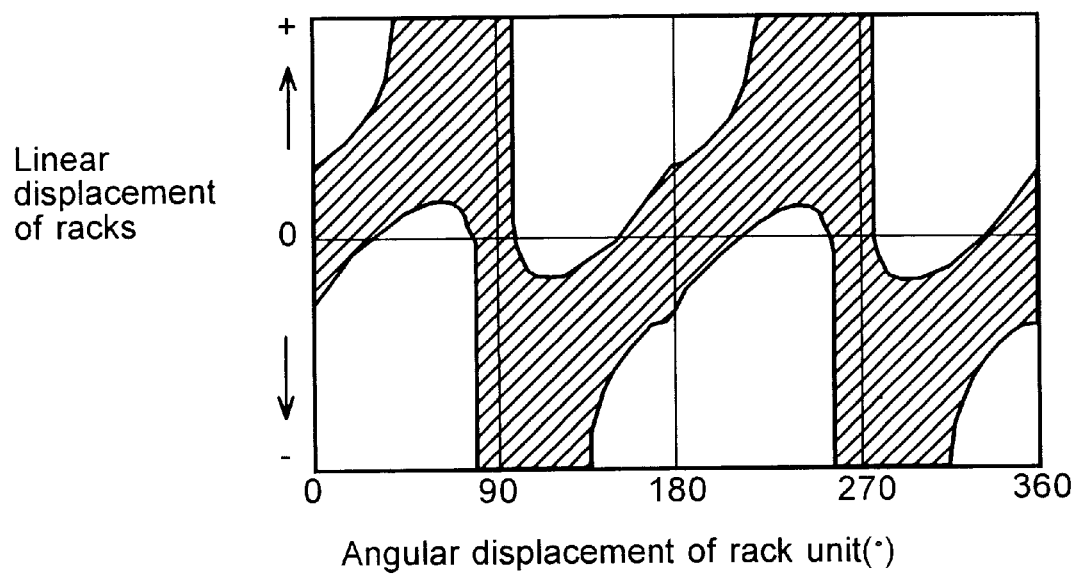
FIGS. 5a–5b are views of assistance in explaining a relation between the angular displacement $\theta$ of the rack and the linear displacement $X(\theta)$ of the racks.
Figure 5B:
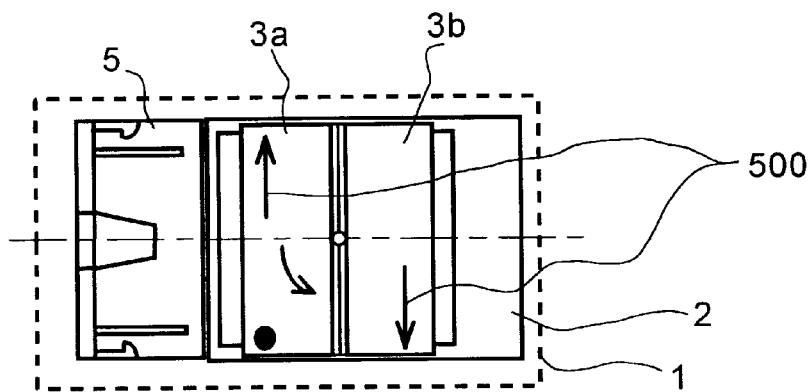

The relation between the angular displacement of the rack unit 3, and the linear displacements of the first rack 3a and the second rack 3b will be described with reference to FIGS. 5a–5b and 6. Positive values of angular displacement and linear displacement are measured in the direction of the arrows 500 shown in FIG. 5b. The first rack 3a and the second rack 3b are symmetrical with respect to the turning axis 13 and hence the respective linear displacements of the first rack 3a and the second rack 3b are opposite to each other as indicated by the arrows 500 in FIG. 5b. In FIG. 5a, a shaded region indicates allowable values of the angular displacement of the rack unit 3 and the corresponding linear displacements of the racks 3a and 3b which prevent the collision of the first rack 3a and the second rack 3b with the side panels (i.e., clearance perimeter) when the rack unit 3 is turned. More particularly, as long as the linear displacements of the first rack 3a and the second rack 3b corresponding to the angular displacement of the rack unit 3 remain in the shaded region, the turning of the rack unit 3 is not obstructed. As is obvious from FIG. 5a, the period of the variation of the shaded region is 180°, and linear displacements in a portion of the shaded region in the angular displacement range of 0° to 90° and those in a portion of the same in the angular displacement range of 90° to 180° have opposite signs, respectively. Therefore, the linear displacements X(θ) of the racks 3a and 3b are varied so as to meet the following expressions.

$$X(\theta) = -X(180° - \theta) \tag{3}$$

$$X(\theta) = X(180° + \theta) \tag{4}$$

Figure 6:
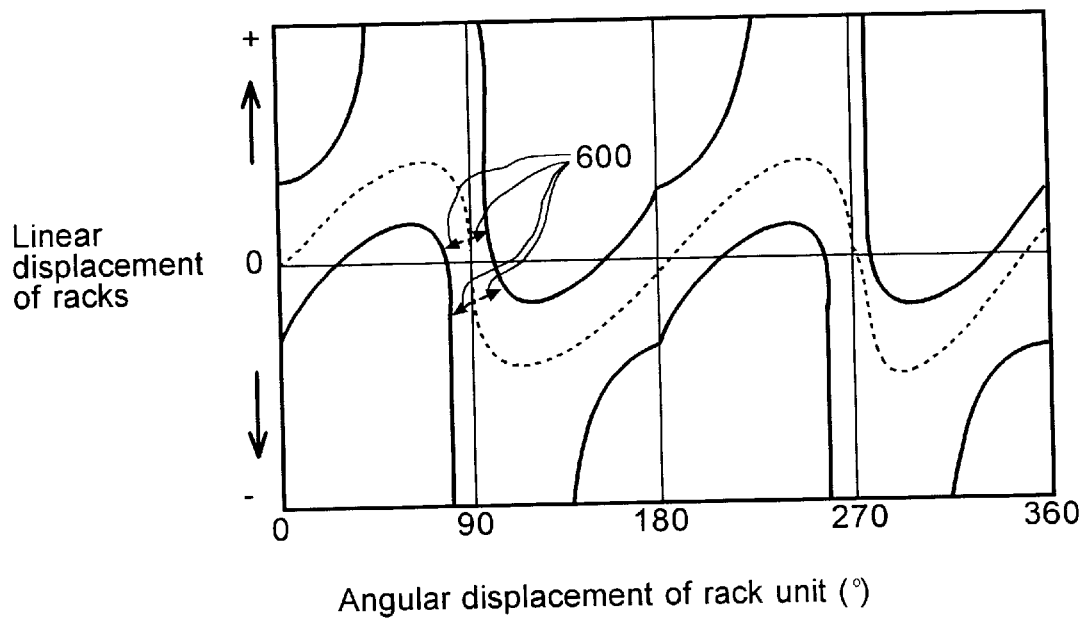
FIG. 6 is a view showing the relation between the angular displacement $\theta$ of a rack and the linear displacement $X(\theta)$ of racks in a second embodiment of the present invention.

FIG. 6 shows one possible example of the variation of the linear displacements of the racks 3a and 3b with the angular displacement of the rack unit 3 in a plat similar to that of FIG. 5a (although cross-hatching has been omitted for clarity), in which a dotted curve represents a chosen variation of the linear displacement of the racks 3a and 3b in the directions of the arrows 500. In this embodiment, the racks 3a and 3b are displaced linearly during the turning of the rack unit 3 so that the clearances between the racks 3a and 3b and the side panels are maintained at a maximum possible separation at all times (i.e., angles of rotation) to secure the safest possible allowances for preventing the collision of the racks 3a and 3b against the side panels in case the center axis of the rack unit 3 does not coincide with the turning axis 13. More particularly, the arrows 600 are used to show that the FIG. 6 curve travels a path which is equidistant from (i.e., in the middle between) the non-allowable regions, thus to continually maximize a separation between the racks 3a, 3b and the side panels.

Figure 7A:
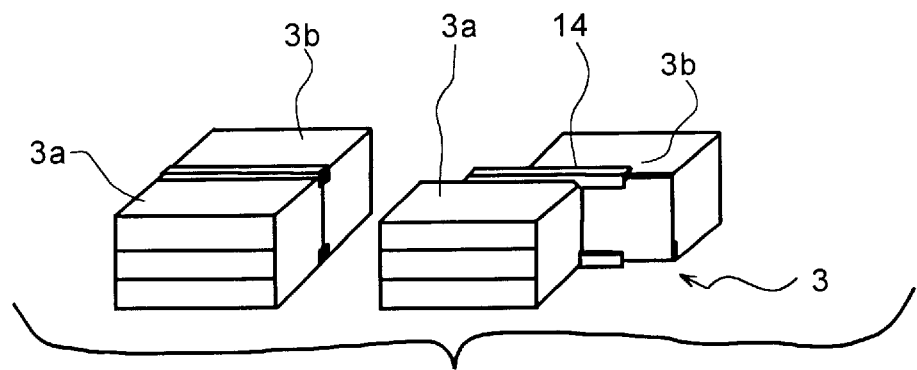
FIGS. 7a–7b are perspective views of the rack unit and a rack support table of the cartridge changer in the second embodiment.

A cartridge changer in a second embodiment according to the present invention capable of realizing the relation between the angular displacement and the linear displacement shown in FIG. 6 will be described with reference to FIGS. 7a–7b and 8a–8b. As shown in FIG. 7a, the cartridge changer has a rack unit 3 provided with a first rack 3a and a second rack 3b. The first rack 3a and the second rack 3b are shifted in opposite directions, respectively, relative to each other as shown in FIGS. 2a–2e. The first rack 3a and the second rack 3b are connected by a rack guide member 14 (e.g., slider) having parallel ridges slidably fitted in parallel grooves formed in the first rack 3a and the second rack 3b. The racks 3a and 3b slide relative to the rack guide member 14 along the parallel ridges.

Figure 7B:
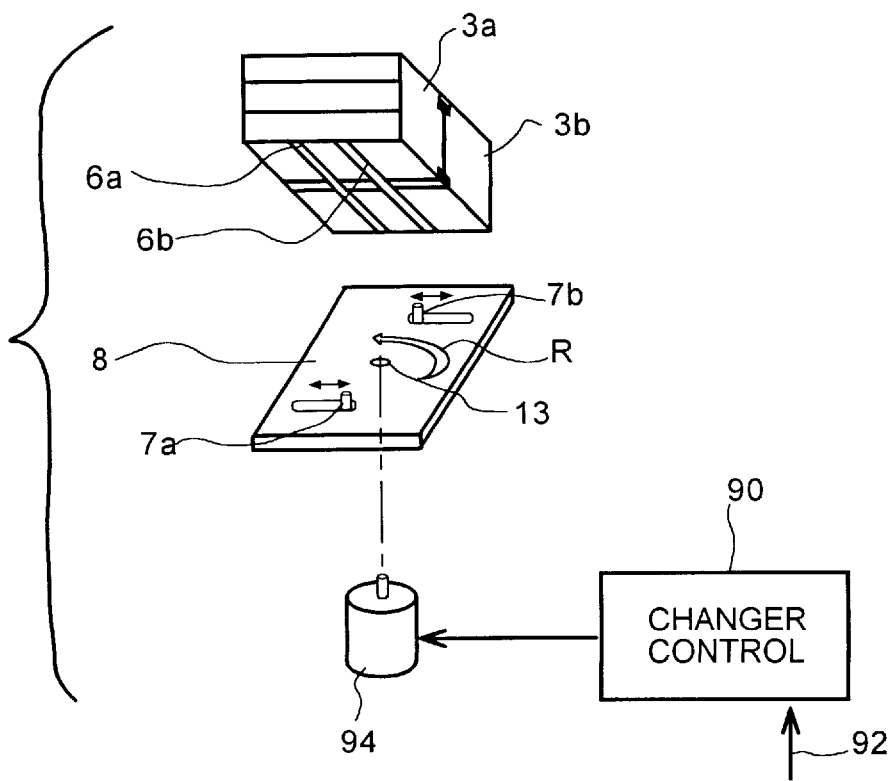

As shown in FIG. 7b, guide grooves 6a and 6b are formed in the lower surfaces of the racks 3a and 3b, and a rotating rack support table 8 for supporting the rack unit 3 is provided with rack moving pins 7a and 7b. The rack moving pins 7a, 7b move through distances corresponding to the required linear displacements of the racks 3a and 3b according to the angular displacement of the rack support table 8, i.e., through the cooperative operation of a changer control 90 receiving an input 92 (e.g. control input) and supplying control/driving signals to a motor 94 which in turn causes the table 8 to rotate. When the rack unit 3 is mounted on the rack support table 8, the rack moving pins 7a and 7b are received in the rack guide grooves 6a and 6b, respectively. The linear displacements of the racks 3a and 3b for the angular displacement of the rack unit 3 are determined by the actions of the rack moving pins 7a and 7b.

Figure 8A:
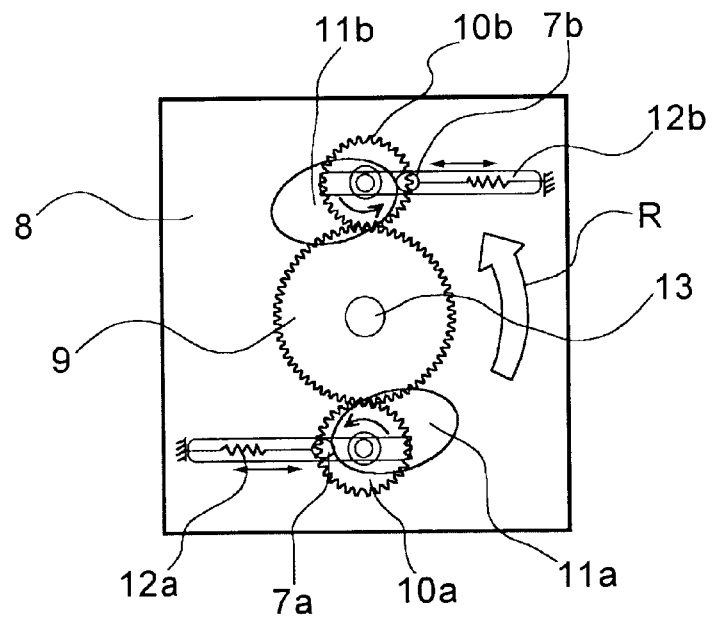
FIGS. 8a–8b are plan views of an internal mechanism included in the rack support table.
Figure 8B:
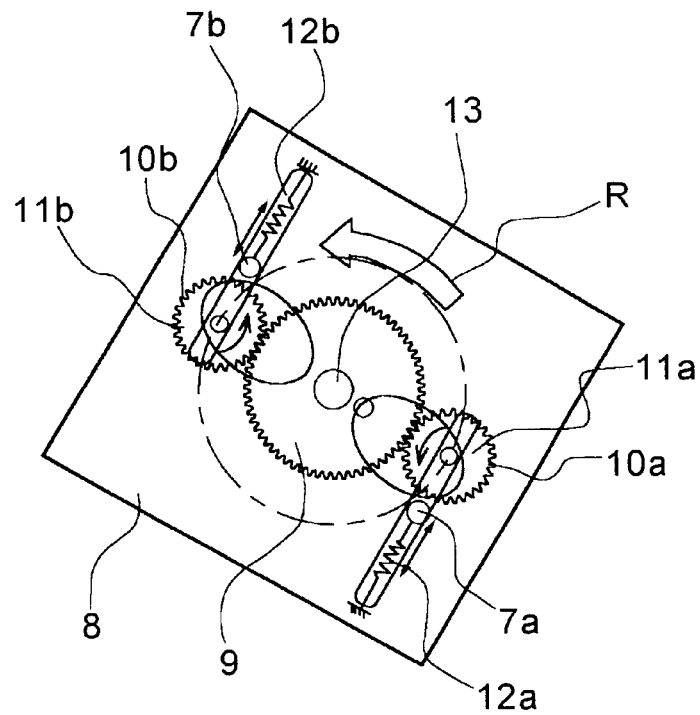

The internal mechanism of the rack support table 8 is shown in FIG. 8a. The internal mechanism includes a fixed gear 9 disposed with its center axis aligned with the turning axis 13 of the rack unit 3, and a pair of rotating pinions 10a and 10b in engagement with the fixed gear 9. The number of teeth of the rotating pinions 10a and 10b is preferably ½ of that of teeth of the fixed gear 9. When the rack support table 8 is turned, the fixed gear 9 remains stationary, while the rotating pinions 10a and 10b revolve around the center axis of the fixed gear 9 aligned with the turning axis 13 of the rack 3 and rotate about their axes, respectively, as shown in FIG. 8b. The angles of rotation of the rotating pinions 10a and 10b is one half the angle of turning of the rack support table 8 and the number of rotations of the same is twice that of turning of the rack support table 8 because the number of teeth of the rotating pinions 10a and 10b is ½ of that of teeth of the fixed gear 9. Cams 11a and 11b are attached to the rotating pinions 10a and 10b. The cams 10a and 10b are designed so that the variation of their pins 7a, 7b corresponds to the variation of the linear displacement in the angular range of 0° to 180° shown in FIG. 5a. More particularly, the rack moving pins 7a and 7b are moved by the cams 11a and 11b to move the racks 3a and 3b accordingly. Such arrangement further includes springs 12a, 12b.

Figure 9:
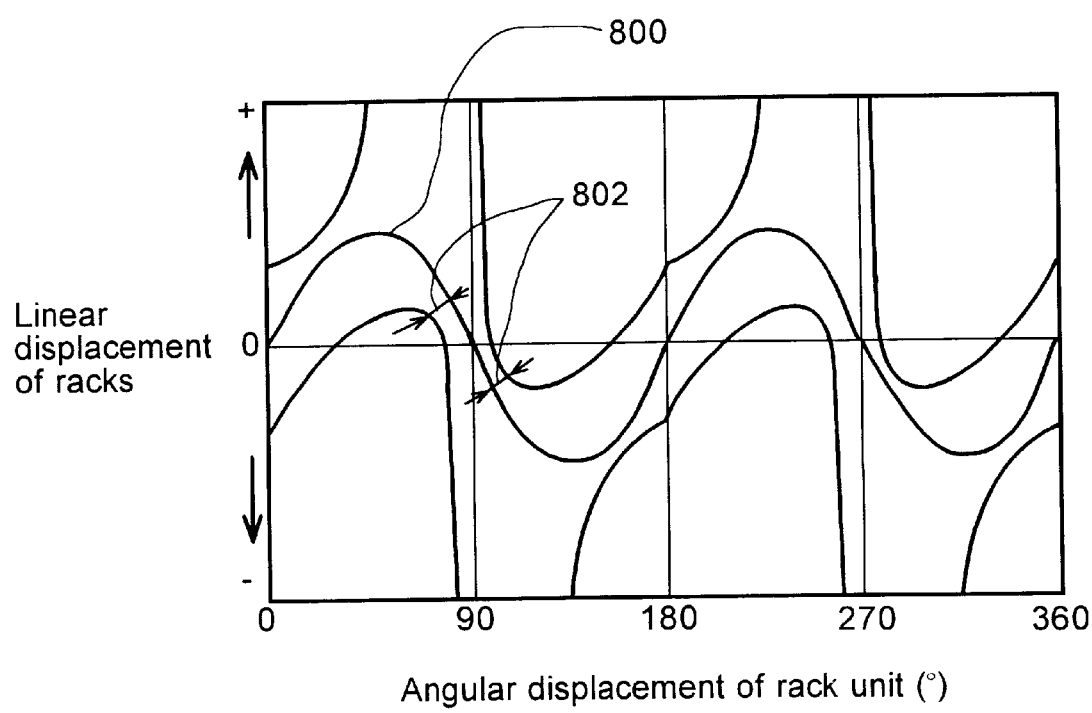
FIG. 9 is a view showing the relation between the angular displacement $\theta$ of a rack unit and the linear displacement of racks in an embodiment of the present invention.
Figure 10A:
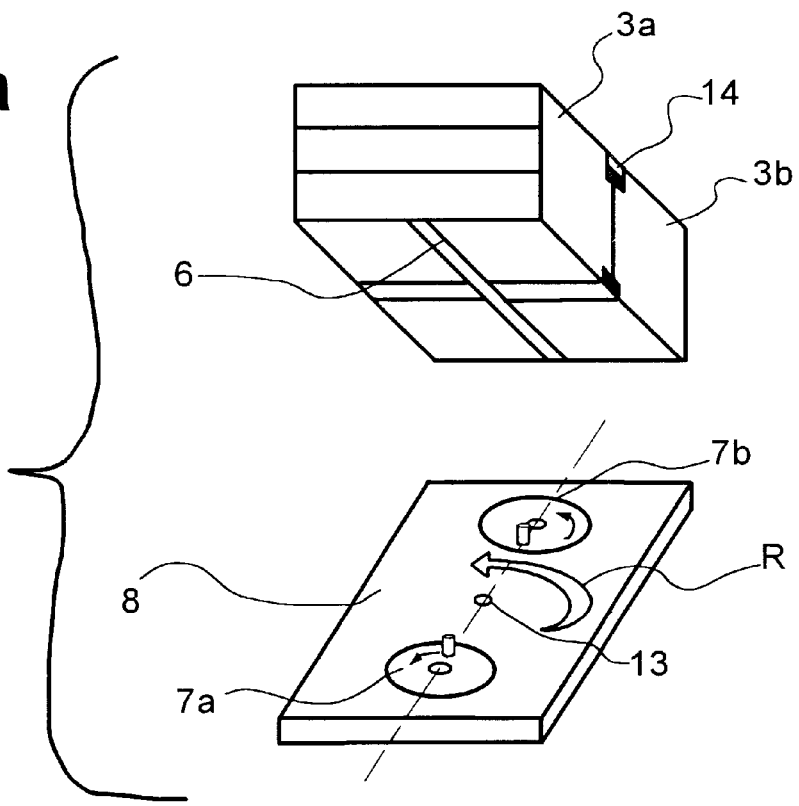
FIGS. 10a–10b are a perspective view and a plan view, respectively, of a rack unit and a rack support table included in a cartridge changer embodying the present invention.
Figure 10B:
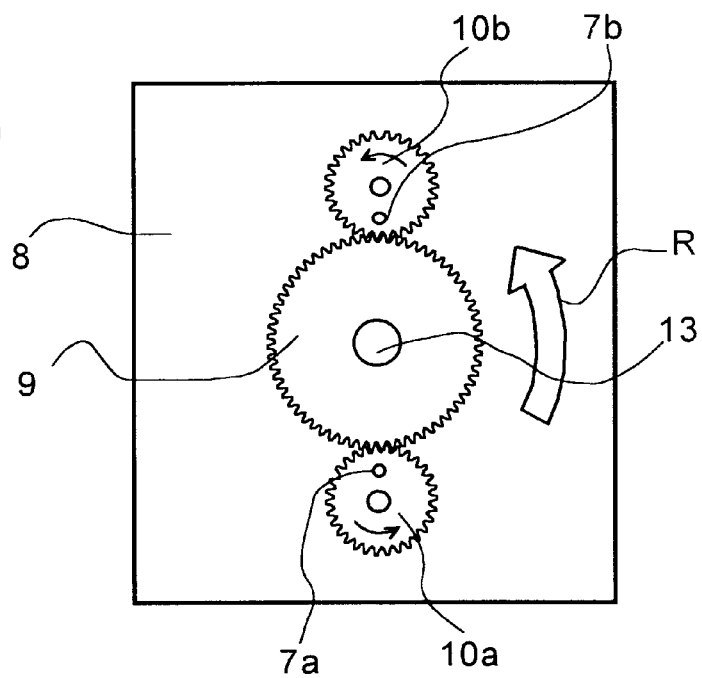

FIG. 9 shows another example of the relation between the angular displacement θ and the linear displacement X(θ) of the racks 3a and 3b, in which:

$$X(\theta) = A \cdot \sin(2\theta) \tag{5}$$

where A is a constant. An allowable positional error in the positions of the rack moving pins 7a and 7b corresponding to angular displacements of about 90° and 270° shown in FIG. 9, as compared with that shown in FIG. 5a, is small. More particularly, in contrast to the curve path in FIG. 6 wherein the path travels along a path which is equidistant from the non-allowable regions, the curve path 800 in FIG. 9 merely travels a sinusoidal path without consideration to maximizing clearances, and from the arrows 802 it can be seen that such FIG. 9 curve path travels close to the non-allowable regions thus indicating only a small clearance during these times. While the smaller clearance and thus smaller allowable error is less desirable than the maximum allowable error arrangement of FIG. 6, such arrangement is more desirable in that the rack support table 8 needs only a simple internal mechanism as shown in FIGS. 10a–10b to move the racks 3a and 3b according to FIG. 9, thus realizing lower manufacturing costs. Since the linear displacements of the rack moving pins 7a and 7b may be sinusoidal, the rack moving pins 7a and 7b are attached eccentrically to the rotating pinions 10a and 10b, respectively, with an eccentricity A so that the rack moving pins 7a and 7b are on a straight line crossing the turning axis 13. The rack moving pins 7a and 7b move along circles as the rotating pinions 10a and 10b rotates. Since the rack moving pins 7a and 7b are fitted in a rack guide groove 6, and the rack unit 3 is constructed so that the first rack 3a and the second rack 3b are able to move in parallel to each other, the linear displacements of the first rack 3a and the second rack 3b vary sinusoidally. Thus, this embodiment does not need the cams 11a and 11b, and compression springs 12a and 12b, which are indispensable to the first embodiment.

As an alternative arrangement to toothed gears, the rack support table 8 may be provided with a fixed roller and rotating rollers disposed in contact with the fixed roller instead of the fixed gear 9 and the rotating pinions 10a and 10b. The fixed roller is formed in a diameter $d_1$ and the rotating rollers are formed in a diameter $d_2$ preferably meeting a mathematical relation of:

$$d_1 = 2 \times d_2 \tag{8}$$

Figure 11:
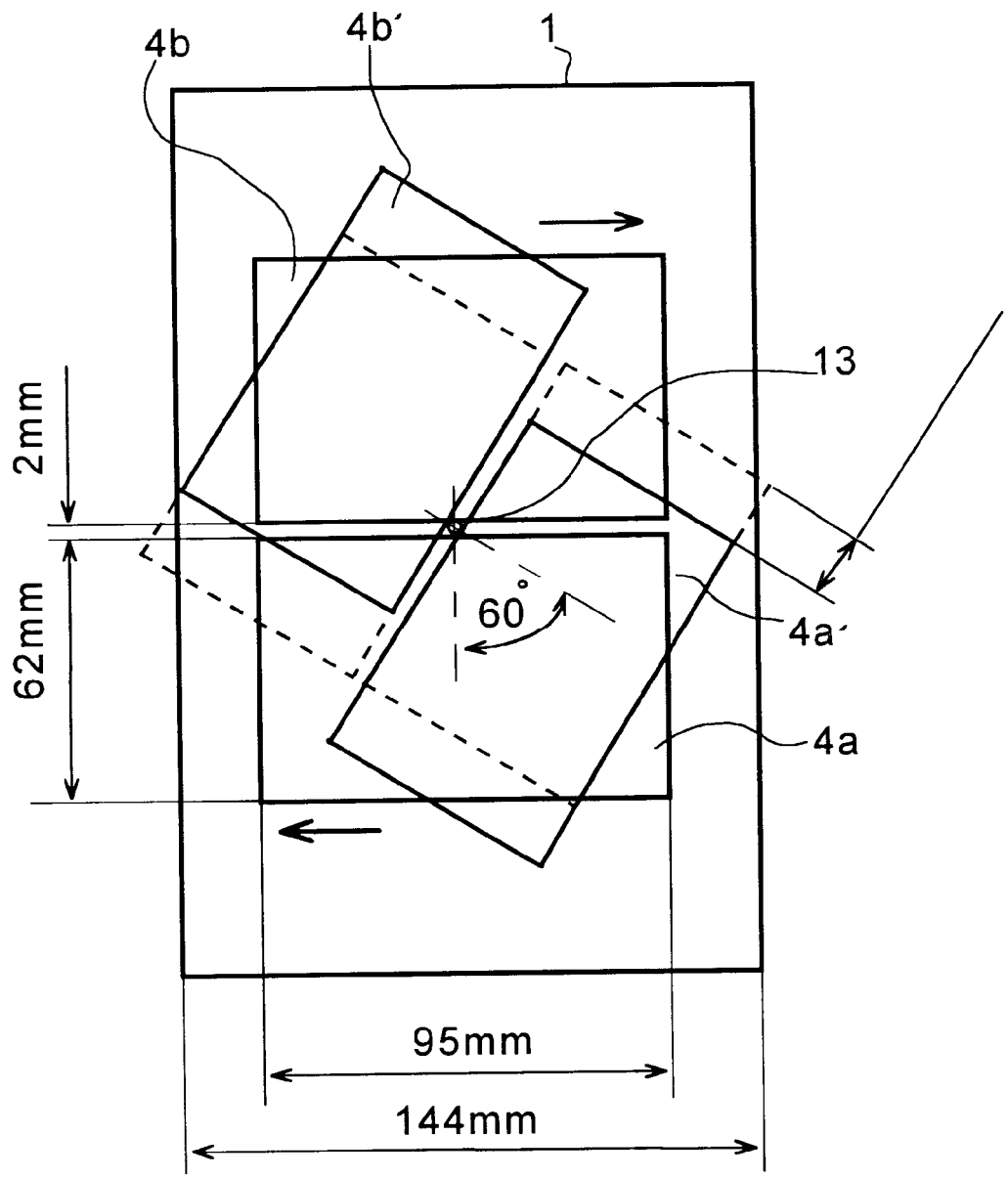
FIG. 11 is a diagrammatic view showing the dimensions of a cartridge changer embodying the present invention and a rack unit included in the cartridge changer.
Figure 12:
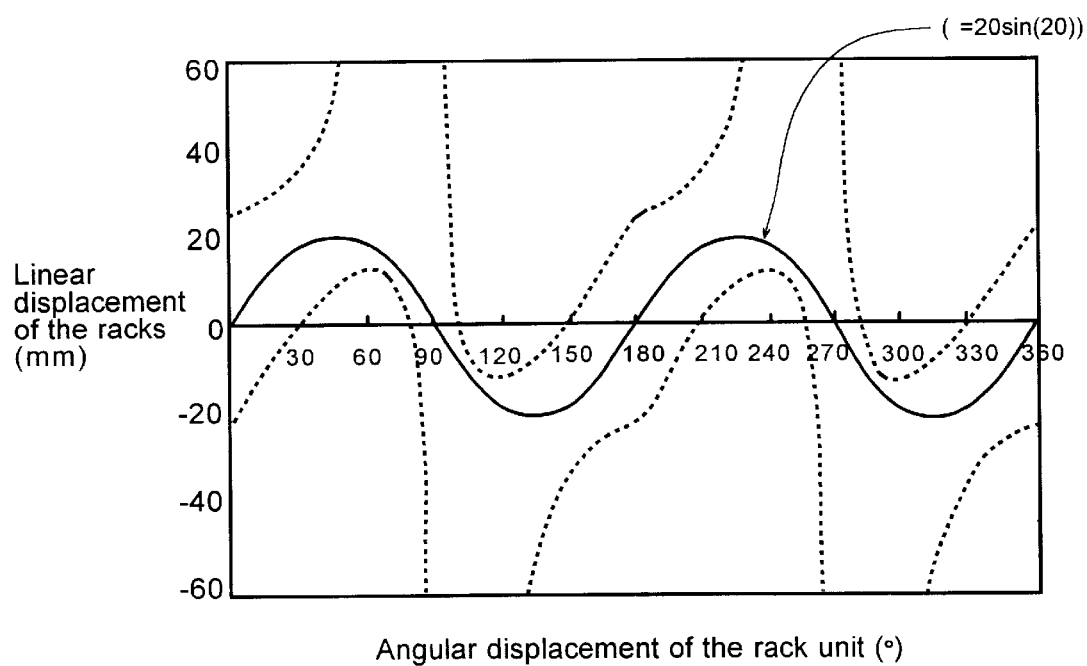
FIG. 12 is a graph showing the variation of the linear displacements of the racks of a rack unit included in a cartridge changer embodying the present invention and the angular displacement of the rack unit.
Figure 13:
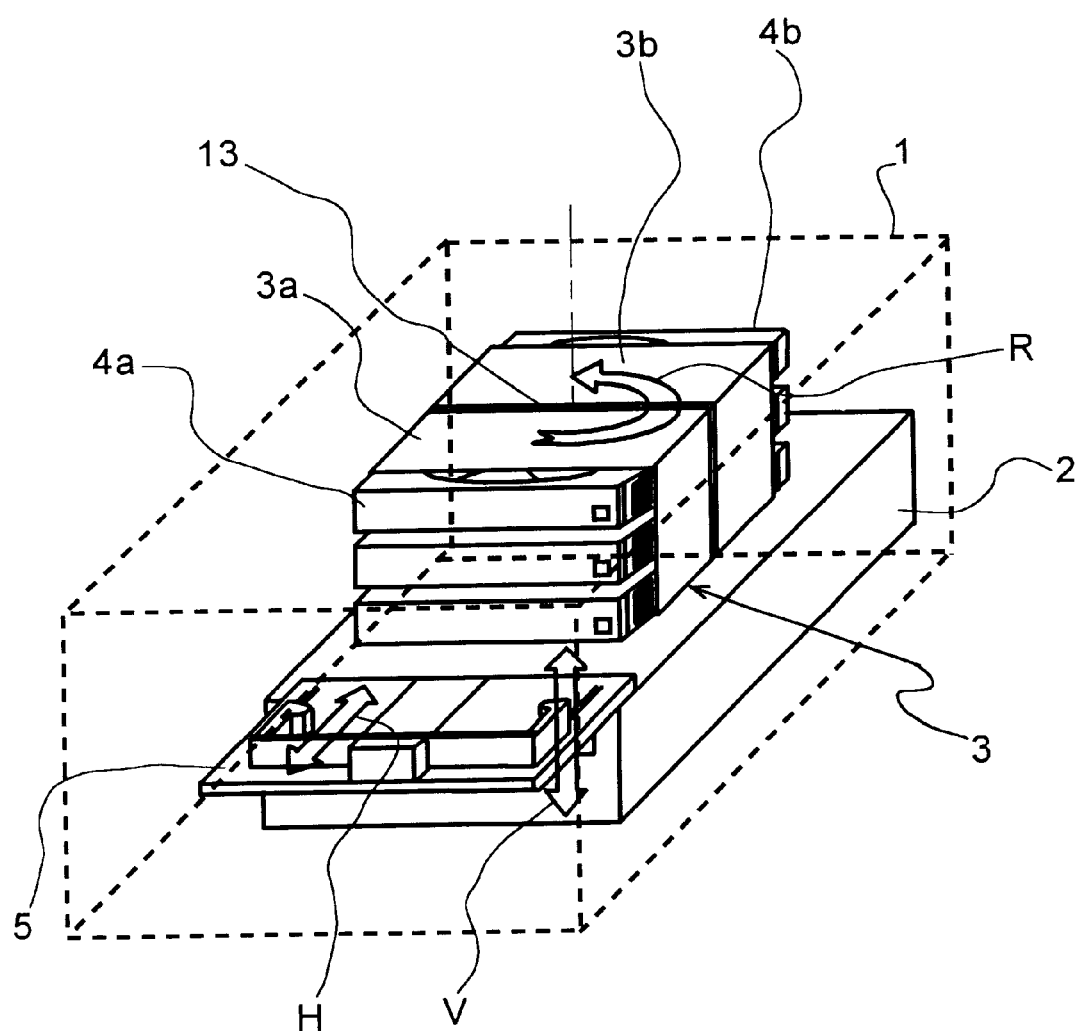
FIG. 13 is a schematic perspective view of a background cartridge changer, such view being for background discussion.
Figure 14A:
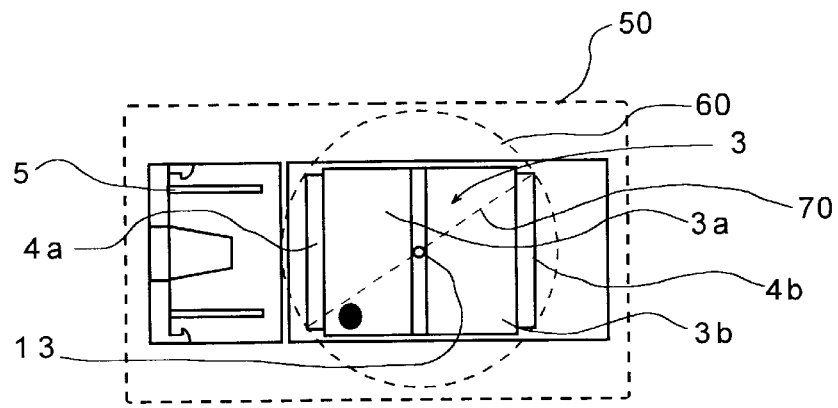
FIGS. 14a–14d are schematic plan views of the FIG. 13 cartridge changer in different phases of an operation with respect to the turning of a rack unit included in the cartridge changer.
Figure 14B:
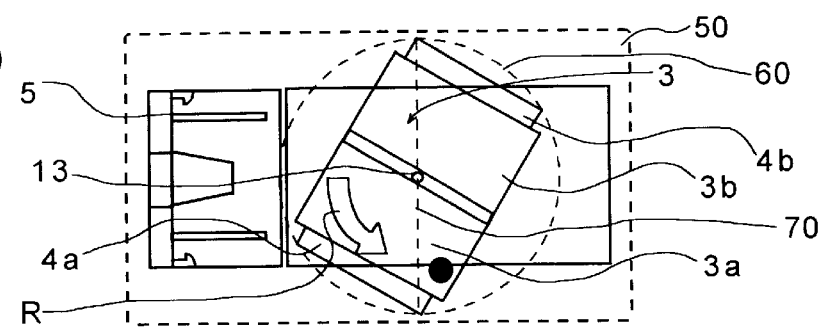
Figure 14C:
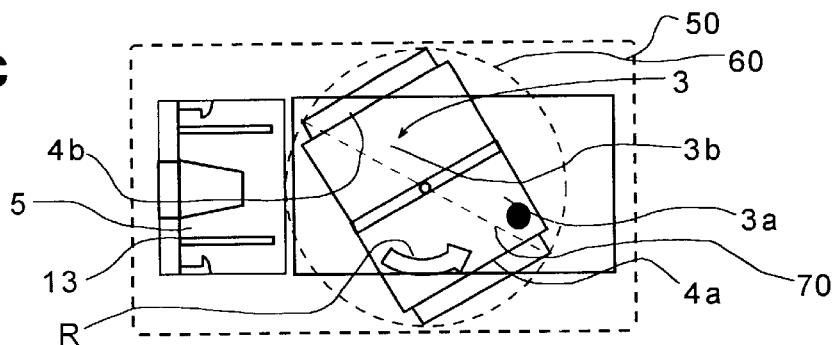
Figure 14D:
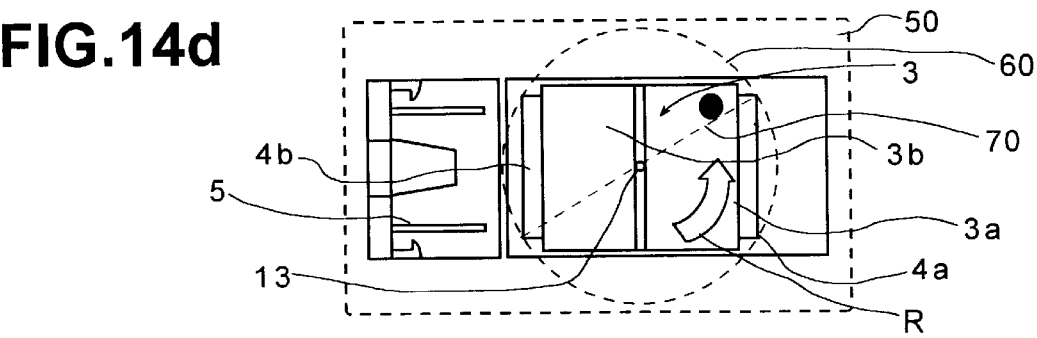
Figure 15A:
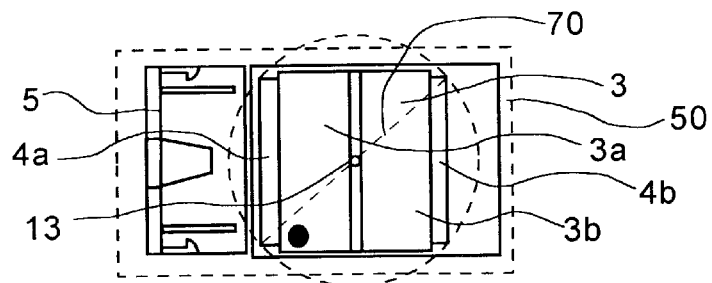
FIGS. 15a–15b are views of a cartridge changer provided with a rack unit of an interfering size, and 15c is a view illustrating dimensional variables of a generic cartridge changer.
Figure 15B:
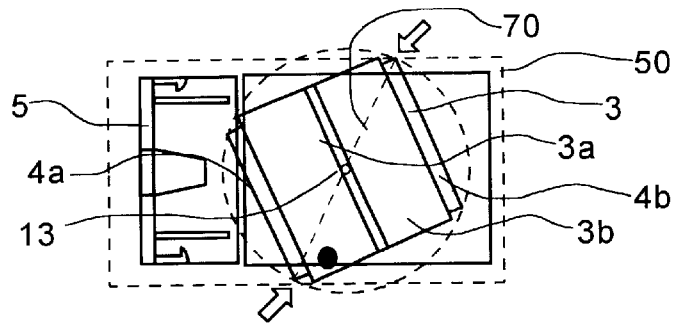
Figure 15C:
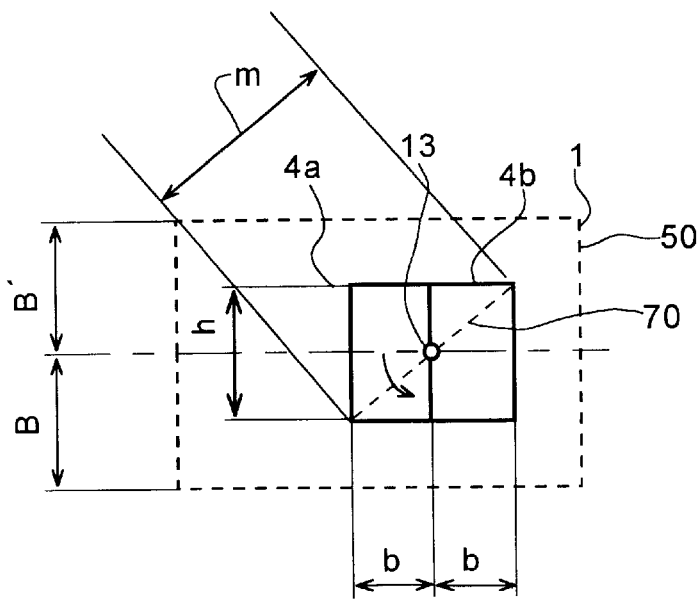

Moving on in discussion, the relation between the dimensions of the components of the cartridge changer in accordance with the present invention will concretely be described hereinafter. Referring to FIG. 11 showing the data storage unit 1 in a top plan view, the data storage unit 1 has a width of 146 mm, which is approximately equal to the width of a 5.25 in. tape drive, and is designed to handle cartridges of 95 mm in width and 62 mm in depth for 8 mm tapes. If the thickness of the side panels of the casing of the cartridge changer 1 is about 1 mm, the inside width of the clearance perimeter (i.e., casing) which is available for turning the rack unit 3, is about 144 mm. Cartridges are stored in the first rack 3a and the second rack 3b with a clearance of about 2 mm therebetween. FIG. 12 is a graph showing the variation of the necessary linear displacement of the racks 3a and 3b with the angular displacement of the rack unit 3 when the rack unit 3 is turned in the casing of the cartridge changer 1. Suppose that the relation between the linear displacement X(θ) (mm) of the racks 3a and 3b, and the angular displacement θ (degree) of the rack 3 is expressed by the following expression by way of example:

$$X(\theta) = 20 \sin 2\theta \tag{9}$$

Then, the necessary inside width of the casing of the data storage unit 1 is about 140.2 mm, and the rack unit 3 storing cartridges for 8 mm tapes can be turned in the casing having a relatively small width of the cartridge changer 1, whereas the necessary inside width of the casing of a corresponding conventional cartridge changer in which the racks of the rack unit are not linearly displaced is about 156.2 mm. Such a disadvantaged 156.2 mm cartridge changer cannot be used in a 5.25 in. tape drive area, whereas the linearly displaced 140.2 mm cartridge changer of the present invention can.

If a cartridge changer is designed for handling cartridges of about 66 mm in width and about 43 mm in depth for tapes of about 6 mm in width. The necessary inside width of the casing of the cartridge changer is about 86 mm (=43×2), which is smaller than a width of 101.6 mm. Therefore, this cartridge changer can also be used in a space typically allotted to a 3.5 in. disc drive area. The inside width of the casing of a corresponding conventional 6 mm cartridge changer, in which the racks are not shifted linearly, is about 108.4 mm and hence this conventional cartridge changer cannot be used in a 3.5 in. tape drive area. More particularly, as is clear from the above discussion, such 6 mm cartridge tape changer with shifting can fit within any area having a predetermined width within the range of 86 mm–101.6 mm. By designing such 6 mm cartridge to have a predetermined width of less than 101.6 mm (e.g., 86 mm), any unused width portion of the 101.6 mm standardized narrow width of a 3.5 inch floppy drive bay is efficiently available to house additional components (e.g., the additional components 104 of a data storage unit 102, described with respect to FIG. 16). Again, the space saving advantage of the present invention can clearly be seen.

Accordingly, with the present invention, if the necessary distances B and B' meet Expression (2), $$B + B' < \sqrt{h^2 + 4b^2} \qquad (2)$$

the mechanism is able to interchange the respective positions of the first rack and the second rack. When two racks having h=95 mm and b=62 mm are used, B, B'≈78 mm in the conventional cartridge changer, while B, B'=62 mm in the cartridge changer of the present invention. Therefore, the cartridge changer of the present invention is able to handle cartridges for 8 mm tapes of about 95 mm×about 62 mm, if the width thereof is about 146 mm.

This concludes the description of the preferred embodiments.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject cartridge changer combination arrangement within the scope of the foregoing disclosure, the drawings and the appended claims without departing from the spirit of the invention, e.g., the following represents a non-exhaustive list of modifications which might readily be apparent to one skilled in the art to which the present invention is directed:

While the above disclosure has discussed applications of the subject rack shifting arrangement with respect to two opposing racks, it will be apparent to those skilled in the art that such rack shifting arrangement is not so limited to such usage, but instead, could find application in rack systems having more than two racks. Further, while the present invention has been described as being applicable to magnetic tape cartridges for storing computing data, the invention is likewise applicable to the handling of other types of cartridges such as (PCMCIA) hard disk cards and (PCMCIA) IC memory cards.

What is claimed and desired to be secured by Letters Patent of the United States is:

1. A cartridge changer having a predetermined clearance width across a predetermined rotational plane, such predetermined clearance width defining an allowable range of travel for moving components within said changer, said changer comprising:

a rotatable rack storing at least first and second cartridges in predetermined rack positions with respect to each other in said predetermined rotational plane, such that at least one distance extending across said first and second cartridges in said predetermined rotational plane and through a rotational axis of said rack while said first and second cartridges are in said predetermined rack positions is greater than said predetermined clearance width of said cartridge changer; and a rotator for rotating said rack in said predetermined rotationed plane, so as to exchange a position of said first and second cartridges within said rotational plane without exceeding said predetermined clearance width of said cartridge changer, wherein said rotator more specifically performs, a combination of rotation and shifting of said first and second cartridges out of said predetermined rack positions and within said rotational plane to accomplish exchange of said first and second cartridges within said rotational plane without exceeding said predetermined clearance width of said cartridge changer.

2. A cartridge changer as claimed in claim 1, wherein said shifting is more specifically linear displacement of said first and second cartridges in a direction parallel to a diameter defined in said predetermined rotational plane and through said rotational axis of said rack, and wherein an amount of linear displacement of said first and second cartridges at any given point of rotation is dependent on an amount of angular displacement of said rack from a predetermined position.

3. A cartridge changer according to claim 2, wherein respective linear displacements X(θ) of said first and second cartridges are expressed by:

$X(\theta) = -X(180° - \theta)$ $X(\theta) = X(180° + \theta)$ where θ is the angular displacement of the rack.

4. A cartridge changer according to claim 2, wherein respective linear displacements X(θ) of said first and second cartridges are expressed by:

$X(\theta) = A \sin(2\theta)$ where θ is an angular displacement of the rack, and A is a constant.

5. A cartridge changer as claimed in claim 1, wherein:

said predetermined clearance width of said cartridge changer is more specifically equal to a predetermined clearance width within one of a range of 124 mm–146 mm and 86 mm–101.6 mm; and said first and second cartridges more specifically have one of a size of: a cartridge width of 66.2 mm (±0.21), length of 48 mm (±0.3), and height of 12.2 mm (±0.2); and a cartridge width of 95.0 mm (±0.2), length of 62.5 mm (±0.3), and height of 15.0 mm (±0.2).

6. A cartridge changer as claimed in claim 5, wherein said first and second cartridges are more specifically magnetic tape cartridges.

7. A cartridge changer as claimed in claim 6, wherein said first and second cartridges more specifically store computer data.

8. A cartridge changer as claimed in claim 1, wherein said rotator more specifically provides shifting of said first and second cartridges equally and oppositely within said rotational plane, such equal and opposite shifting being with respect to said rotational axis of said rack.

9. A cartridge changer as claimed in claim 8, wherein said rotator comprises at least one component selected from a group of a gear, roller, pinion, cam, spring, groove, motor and controller to provide such equal and opposite shifting of said first and second cartridges.

10. A cartridge changer as claimed in claim 9, wherein said rotator more specifically comprises:
   a fixed gear disposed aligned with said rotational axis of said rack;
   at least one rotating pinion having a number of teeth which is ½ that of a number of teeth of said fixed gear, said at least one rotating pinion being in engagement with said fixed gear such that said at least one rotating pinion rotates and revolves around said rotational axis when said rack is rotated; and
   connection means for causing said first and second cartridges to shift responsive to rotation of said at least one rotating pinion.

11. A cartridge changer as claimed in claim 9, wherein said rotator more specifically comprises:
   a fixed roller disposed aligned with said rotational axis of said rack;
   at least one rotating pinion wherein if $d_1$ is a diameter of said fixed roller and $d_2$ is a diameter of said at least one rotating pinion, then diameters of said fixed roller and said at least one rotating pinion are set according to a formula of $d_1 = 2 \times d_2$, and wherein said at least one rotating pinion being in engagement with said fixed roller such that said at least one rotating pinion rotates and revolves around said rotational axis when said rack is rotated; and
   connection means for causing said first and second cartridges to shift responsive to rotation of said at least one rotating pinion.

12. A cartridge changer as claimed in claim 1, further comprising:
   a conveyor retrieving/returning a selected cartridge from/to said rack, and conveying said selected cartridge, said selected cartridge being one of said first and second cartridges; and
   a recorder/reproducer receiving/surrendering said selected cartridge from/to said conveyor, and performing at least one of recording and reproducing with respect to a recording medium of said selected cartridge.

13. A cartridge changer as claimed in claim 12, wherein said cartridge changer has a cartridge access port to allow extraction/replacement of cartridges in/out of the cartridge changer, and wherein said conveyor has a construction for extraction/replacement of cartridges in/out of the cartridge changer via said cartridge access port with such construction allowing one of an extracting/replacing of one cartridge at a time, and an extracting/replacing of at least a portion of said rack.

14. A cartridge changer having a predetermined clearance width across a predetermined rotational plane, such predetermined clearance width defining allowable range of travel for moving components within said changer, said changer comprising:

a recorder/reproducer cartridge tape drive for driving a magnetic tape cartridge containing a tape as a recording medium;

a rotatable rack for storing a plurality cartridges, having a first and a second rack disposed in predetermined rack positions with respect to each other and arranged in two rows one in front of the other and storing cartridges opposite to each other, respectively, such that at least one distance extending across said first and second racks in said predetermined rotational plane and through a rotational axis of said rack while said first and second racks are in said predetermined rack positions is greater than said predetermined clearance width, said first and second racks being capable of turning about said predetermined rotationl axis within said predetermined rotational plane and shifting out of said predetermined rack positions with respect to each other in a direction parallel to a diameter defined in said predetermined rotational plane and through said rotational axis; and a rotator for rotating and shifting said first and second racks with respect to each other in said predetermined rotational plane, so as to exchange a position of said first and second racks within said rotational plane without exceeding said predetermined clearance width of said cartridge changer.

15. A cartridge changer as claimed in claim 14, wherein said shifting is more specifically linear displacement of said first and second racks, and wherein an amount of linear displacement of said first and second racks at any given point of rotation is dependent on an amount of angular displacement of said rack from a predetermined position.

16. A cartridge changer according to claim 15, wherein respective linear displacements $X(\theta)$ of said first and second racks are expressed by:

$$X(\theta) = -X(180° - \theta)$$

$$X(\theta) = X(180° + \theta)$$

where $\theta$ is the angular displacement of the rack.

17. A cartridge changer according to claim 15, wherein respective linear displacements $X(\theta)$ of said first and second racks are expressed by:

$$X(\theta) = A \sin(2\theta)$$

where $\theta$ is an angular displacement of the rack unit, and A is a constant.

18. A cartridge changer as claimed in claim 14, wherein:
   said predetermined clearance width of said cartridge changer is more specifically equal to a predetermined width within one of a range of 124 mm–146 mm and 86 mm–101.6 mm; and
   said cartridges more specifically have one of a size of: a cartridge width of 66.2 mm (±0.21), length of 48 mm (±0.3), and height of 12.2 mm (±0.2); and a cartridge width of 95.0 mm (±0.2), length of 62.5 mm (±0.3), and height of 15.0 mm (±0.2).

19. A cartridge changer as claimed in claim 18, wherein said cartridges more specifically store computer data.

20. A cartridge changer as claimed in claim 14, wherein said rotator more specifically provides shifting of said first and second racks equally and oppositely within said rotational plane, such equal and opposite shifting being with respect to said rotational axis of said rack.

21. A cartridge changer as claimed in claim 20, wherein said rotator comprises at least one component selected from a group of a gear, roller, pinion, cam, spring, groove, motor and controller to provide such equal and opposite shifting of said first and second racks.

22. A cartridge changer as claimed in claim 21, wherein said rotator more specifically comprises:

a fixed gear disposed aligned with said rotational axis of said rack;

at least one rotating pinion having a number of teeth which is ½ that of a number of teeth of said fixed gear, said at least one rotating pinion being in engagement with said fixed gear such that said at least one rotating pinion rotates and revolves around said rotational axis when said rack is rotated;

connection means for causing said first and second racks to shift responsive to rotation of said at least one rotating pinion.

23. A cartridge changer as claimed in claim 21, wherein said rotator more specifically comprises:

a fixed roller disposed aligned with said rotational axis of said rack;

at least one rotating pinion wherein if $d_1$ is a diameter of said fixed roller and $d_2$ is a diameter of said at least one rotating pinion, then diameters of said fixed roller and said at least one rotating pinion are set according to a formula of $d_1=2\times d_2$, and wherein said at least one rotating pinion being in engagement with said fixed roller such that said at least one rotating pinion rotates and revolves around said rotational axis when said rack is rotated;

connection means for causing said first and second racks to shift responsive to rotation of said at least one rotating pinion.

24. A cartridge changer as claimed in claim 14, further comprising:

a conveyor retrieving/returning a selected cartridge from/to said rack, and conveying said selected cartridge, said selected cartridge being one of said plurality of cartridges; and wherein said recorder/reproducer cartridge tape drive receiving/surrendering said selected cartridge from/to said conveyor.

25. A cartridge changer as claimed in claim 24, wherein said cartridge changer has a cartridge access port to allow extraction/replacement of cartridges in/out of the cartridge changer, and wherein said conveyor has a construction for extraction/replacement of cartridges in/out of the cartridge changer via said cartridge access port with such construction allowing one of an extracting/replacing of one cartridge at a time, and an extracting/replacing of at least a portion of said rack.

26. A data storage unit comprising:

a case having a predetermined internal clearance width across a predetermined rotational plane, such predetermined internal clearance width determining an allowable range of travel for moving components within said case; and a cartridge changer having a predetermined perimeter width across said predetermined rotational plane, said predetermined perimeter width of said cartridge changer not exceeding said predetermined internal clearance width of said case, said cartridge changer comprising:

a rotatable rack storing at least first and second cartridges in predetermined rack positions with respect to each other in said predetermined rotational plane, such that at least one distance extending across said first and second cartridges in said predetermined rotational plane and through a rotational axis of said rack while said first and second cartridges are in said predetermined rack positions is greater than said predetermined perimeter width of said cartridge changer; and a rotator for rotating said rack in said predetermined rotational plane, so as to exchange a position of said first and second cartridges within said rotational plane without exceeding said predetemined perimeter width of said cartridge changer, wherein said rotator more specifically performs a combination of rotation and shifting of said first and second cartridges out of said predetermined rack positions and within said rotational plane to accomplish exchange of said first and second cartridge within said rotational plane without exceeding said predetermined perimeter width of said cartridge changer.

27. A data storage unit as claimed in claim 26, wherein said shifting is more specifically linear displacement of said first and second cartridges in a direction parallel to a diameter defined in said predetermined rotational plane and through said rotational axis of said rack, and wherein an amount of linear displacement of said first and second cartridges at any given point of rotation is dependent on an amount of angular displacement of said rack from a predetermined position.

28. A data storage unit according to claim 27, wherein respective linear displacements $X(\theta)$ of said first and second cartridges are expressed by:

$$X(\theta)=-X(180°-\theta)$$

$$X(\theta)=X(180°+\theta)$$

where $\theta$ is the angular displacement of the rack.

29. A data storage unit according to claim 27, wherein respective linear displacements $X(\theta)$ of said first and second cartridges are expressed by:

$$X(\theta)=A\sin(2\theta)$$

where $\theta$ is an angular displacement of the rack, and A is a constant.

30. A data storage unit as claimed in claim 26, wherein:

said case more specifically has a predetermined internal clearance width of one of substantially 146 mm and substantially 101.6 mm;

said predetermined perimeter width of said cartridge changer is more specifically equal to a predetermined width within one of a range of 124 mm–146 mm and 86 mm–101.6 mm; and said first and second cartridges more specifically have one of a size of: a cartridge width of 66.2 mm (±0.21), length of 48 mm (±0.3), and height of 12.2 mm (±0.2); and a cartridge width of 95.0 mm (±0.2), length of 62.5 mm (±0.3), and height of 15.0 mm (±0.2).

31. A data storage unit as claimed in claim 30, wherein said data storage unit is more specifically a magnetic tape backup unit, and said first and second cartridges are more specifically magnetic tape cartridges.

32. A data storage unit as claimed in claim 31, wherein said first and second cartridges more specifically store computer data.

33. A data storage unit as claimed in claim 26, wherein said rotator more specifically provides shifting of said first and second cartridges equally and oppositely within said rotational plane, such equal and opposite shifting being with respect to said rotational axis of said rack.

34. A data storage unit as claimed in claim 33, wherein said rotator comprises at least one component selected from a group of a gear, roller, pinion, cam, spring, groove, motor and controller to provide such equal and opposite shifting of said first and second cartridges.

35. A data storage unit as claimed in claim 34, wherein said rotator more specifically comprises:
   a fixed gear disposed aligned with said rotational axis of said rack;
   at least one rotating pinion having a number of teeth which is ½ that of a number of teeth of said fixed gear, said at least one rotating pinion being in engagement with said fixed gear such that said at least one rotating pinion rotates and revolves around said rotational axis when said rack is rotated; and
   connection means for causing said first and second cartridges to shift responsive to rotation of said at least one rotating pinion.

36. A data storage unit as claimed in claim 34, wherein said rotator more specifically comprises:
   a fixed roller disposed aligned with said rotational axis of said rack;
   at least one rotating pinion wherein if $d_1$ is a diameter of said fixed roller and $d_2$ is a diameter of said at least one rotating pinion, then diameters of said fixed roller and said at least one rotating pinion are set according to a formula of $d_1=2 \times d_2$, and wherein said at least one rotating pinion being in engagement with said fixed roller such that said at least one rotating pinion rotates and revolves around said rotational axis when said rack is rotated; and
   connection means for causing said first and second cartridges to shift responsive to rotation of said at least one rotating pinion.

37. A data storage unit as claimed in claim 26, further comprising:
   a conveyor retrieving/returning a selected cartridge from/to said rack, and conveying said selected cartridge, said selected cartridge being one of said first and second cartridges; and
   a recorder/reproducer receiving/surrendering said selected cartridge from/to said conveyor, and performing at least one of recording and reproducing with respect to a recording medium of said selected cartridge.

38. A data storage unit as claimed in claim 37, wherein at least one of said data storage unit and said cartridge changer has a cartridge access port to allow extraction/replacement of cartridges in/out of the cartridge changer, and wherein said conveyor has a construction for extraction/replacement of cartridges in/out of the cartridge changer via said cartridge access port with such construction allowing one of an extracting/replacing of one cartridge at a time, and an extracting/replacing of at least a portion of said rack.

39. A data storage unit comprising:
   a case having a predetermined internal clearance width across a predetermined rotational plane, such predetermined internal clearance width determining an allowable range of travel for moving components within said case; and
   a cartridge changer having a predetermined perimeter width determining an allowable range of travel for moving components within said changer, said cartridge changer comprising:
      a recorder/reproducer cartridge tape drive for driving a magnetic tape cartridge containing a tape as a recording medium;
      a rotatable rack for storing a plurality of cartridges, and having a first and a second rack disposed in predetermined rack positions arranged in two rows one in front of the other and storing cartridges opposite to each other, respectively, such that at least one distance extending across said first and second racks in said predetermined rotational plane and through a rotational axis of said rack while said first and second racks are in said predetermined rack positions is greater than said predetermined perimeter width, said first and second racks being capable of turning about a predetermined rotational axis within a predetermined rotational plane and shifting out of said predetermined rack positions in a direction parallel to a diameter defined in said predetermined rotational plane and through said rotational axis; and
      a rotator for rotating and shifting said first and second racks with respect to each other in said predetermined rotational plane, so as to exchange a position of said first and second racks within said rotational plane without exceeding said predetermined perimeter width of said cartridge changer.

40. A data storage unit as claimed in claim 39, wherein said shifting is more specifically linear displacement of said first and second racks, and wherein an amount of linear displacement of said first and second racks at any given point of rotation is dependent on an amount of angular displacement of said rack from a predetermined position.

41. A data storage unit according to claim 40, wherein respective linear displacements $X(\theta)$ of said first and second racks are expressed by:

$$X(\theta)=-X(180°-\theta)$$
$$X(\theta)=X(180°+\theta)$$

where $\theta$ is the angular displacement of the rack.

42. A data storage unit according to claim 40, wherein respective linear displacements $X(\theta)$ of said first and second racks are expressed by:

$$X(\theta)=A \sin(2\theta)$$

where $\theta$ is an angular displacement of the rack unit, and A is a constant.

43. A data storage unit as claimed in claim 39, wherein:
   said case more specifically has a predetermined internal clearance width of one of substantially 146 mm and substantially 101.6 mm;
   said predetermined perimeter width of said cartridge changer is more specifically equal to a predetermined perimeter width within one of a range of 124 mm–146 mm and 86 mm–101.6 mm; and
   said cartridges more specifically have one of a size of: a cartridge width of 66.2 mm (±0.21), length of 48 mm (±0.3), and height of 12.2 mm (±0.2); and a cartridge width of 95.0 mm (±0.2), length of 62.5 mm (±0.3), and height of 15.0 mm (±0.2).

44. A data storage unit as claimed in claim 43, wherein said data storage unit is more specifically a magnetic tape backup unit.

45. A data storage unit as claimed in claim 39, wherein said rotator more specifically provides shifting of said first and second racks equally and oppositely within said rotational plane, such equal and opposite shifting being with respect to said rotational axis of said rack.

46. A data storage unit as claimed in claim 45, wherein said rotator comprises at least one component selected from a group of a gear, roller, pinion, cam, spring, groove, motor and controller to provide such equal and opposite shifting of said first and second racks.

47. A data storage unit as claimed in claim 46, wherein said rotator more specifically comprises:
 a fixed gear disposed aligned with said rotational axis of said rack;
 at least one rotating pinion having a number of teeth which is ½ that of a number of teeth of said fixed gear, said at least one rotating pinion being in engagement with said fixed gear such that said at least one rotating pinion rotates and revolves around said rotational axis when said rack is rotated;
 connection means for causing said first and second racks to shift responsive to rotation of said at least one rotating pinion.

48. A data storage unit as claimed in claim 46, wherein said rotator more specifically comprises:
 a fixed roller disposed aligned with said rotational axis of said rack;
 at least one rotating pinion wherein if $d_1$ is a diameter of said fixed roller and $d_2$ is a diameter of said at least one rotating pinion, then diameters of said fixed roller and said at least one rotating pinion are set according to a formula of $d_1=2\times d_2$, and wherein said at least one rotating pinion being in engagement with said fixed roller such that said at least one rotating pinion rotates and revolves around said rotational axis when said rack is rotated;
 connection means for causing said first and second racks to shift responsive to rotation of said at least one rotating pinion.

49. A data storage unit as claimed in claim 39, further comprising:
 a conveyor retrieving/returning a selected cartridge from/to said rack, and conveying said selected cartridge, said selected cartridge being one of said plurality of cartridges; and
 wherein said recorder/reproducer cartridge tape drive receiving/surrendering said selected cartridge from/to said conveyor.

50. A data storage unit as claimed in claim 49, wherein at least one of said data storage unit and said cartridge changer has a cartridge access port to allow extraction/replacement of cartridges in/out of the cartridge changer, and wherein said conveyor has a construction for extraction/replacement of cartridges in/out of the cartridge changer via said cartridge access port, with such construction allowing one of an extracting/replacing of one cartridge at a time, and an extracting/replacing of at least a portion of said rack.

51. An apparatus comprising: data storage unit comprising:
 a cartridge changer having a predetermined perimeter width across a predetermined rotational plane, said predetermined perimeter width of said cartridge changer defining an allowable range of travel for moving components within said changer and not exceeding a predetermined clearance width of said data storage unit, said cartridge changer comprising:
  a rotatable rack storing at least first and second cartridges in predetermined rack positions with respect to each other in said predetermined rotational plane, wherein at least one distance extending across said first and second cartridges in said predetermined rotational plane and through a rotational axis of said rack while said first and second cartridges are in said predetermined rack positions is greater than said predetermined perimeter width of said cartridge changer; and
  a rotator for rotating said rack in said predetermined rotational plane, so as to exchange a position of said first and second cartridges within said rotational plane without exceeding said predetermined perimeter width of said cartridge changer, wherein said rotator more specifically performs a combination of rotation and shifting of said first and second cartridges out of said predetermined rack positions and within said rotational plane to accomplish exchange of said first and second cartridges within said rotational plane without exceeding said predetermined perimeter width of said cartridge changer.

52. An apparatus as claimed in claim 51, wherein said shifting is more specifically linear displacement of said first and second cartridges in a direction parallel to a diameter defined in said predetermined rotational plane and through said rotational axis of said rack, and wherein an amount of linear displacement of said first and second cartridges at any given point of rotation is dependent on an amount of angular displacement of said rack from a predetermined position.

53. An apparatus according to claim 52, wherein respective linear displacements $X(\theta)$ of said first and second cartridges are expressed by:

$$X(\theta)=-X(180°-\theta)$$

$$X(\theta)=X(180°+\theta)$$

where $\theta$ is the angular displacement of the rack.

54. An apparatus according to claim 52, wherein respective linear displacements $X(\theta)$ of said first and second cartridges are expressed by:

$$X(\theta)=A \sin(2\theta)$$

where $\theta$ is an angular displacement of the rack, and A is a constant.

55. An apparatus as claimed in claim 51, wherein:
 said apparatus has a bay for installation of said data storage unit, said bay having a predetermined bay width of one of substantially 146 mm and substantially 101.6 mm;
 a width of said data storage unit is equal to a predetermined width within one of a range of 124 mm–146 mm and 86 mm–101.6 mm; and
 said first and second cartridges more specifically have one of a size of: a cartridge width of 66.2 mm (±0.21), length of 48 mm (±0.3), and height of 12.2 mm (±0.2); and a cartridge width of 95.0 mm (±0.2), length of 62.5 mm (±0.3), and height of 15.0 mm (±0.2).

56. An apparatus as claimed in claim 55, wherein said data storage unit is more specifically a magnetic tape storage unit, and said first and second cartridges are more specifically magnetic tape cartridges.

57. An apparatus as claimed in claim 56, wherein said apparatus is more specifically a computer apparatus, and said first and second cartridges more specifically store computer data.

58. An apparatus as claimed in claim 51, wherein said rotator more specifically provides shifting of said first and second cartridges equally and oppositely within said rotational plane, such equal and opposite shifting being with respect to said rotational axis of said rack.

59. An apparatus as claimed in claim 58, wherein said rotator comprises at least one component selected from a group of a gear, roller, pinion, cam, spring, groove, motor and controller to provide such equal and opposite shifting of said first and second cartridges.

60. An apparatus as claimed in claim 59, wherein said rotator more specifically comprises:
    a fixed gear disposed aligned with said rotational axis of said rack;
    at least one rotating pinion having a number of teeth which is ½ that of a number of teeth of said fixed gear, said at least one rotating pinion being in engagement with said fixed gear such that said at least one rotating pinion rotates and revolves around said rotational axis when said rack is rotated; and
    connection means for causing said first and second cartridges to shift responsive to rotation of said at least one rotating pinion.

61. An apparatus as claimed in claim 59, wherein said rotator more specifically comprises:
    a fixed roller disposed aligned with said rotational axis of said rack;
    at least one rotating pinion wherein if $d_1$ is a diameter of said fixed roller and $d_2$ is a diameter of said at least one rotating pinion, then diameters of said fixed roller and said at least one rotating pinion are set according to a formula of $d_1 = 2 \times d_2$, and wherein said at least one rotating pinion being in engagement with said fixed roller such that said at least one rotating pinion rotates and revolves around said rotational axis when said rack is rotated; and
    connection means for causing said first and second cartridges to shift responsive to rotation of said at least one rotating pinion.

62. An apparatus as claimed in claim 51, further comprising:
    a conveyor retrieving/returning a selected cartridge from/to said rack, and conveying said selected cartridge, said selected cartridge being one of said first and second cartridges; and
    a recorder/reproducer receiving/surrendering said selected cartridge from/to said conveyor, and performing at least one of recording and reproducing with respect to a recording medium of said selected cartridge.

63. An apparatus as claimed in claim 62, wherein at least one of said data storage unit and said cartridge changer has a cartridge access port to allow extraction/replacement of cartridges in/out of the cartridge changer, and wherein said conveyor has a construction for extraction/replacement of cartridges in/out of the cartridge changer via said cartridge access port with such construction allowing one of an extracting/replacing of one cartridge at a time, and an extracting/replacing of at least a portion of said rack.

64. An cartridge apparatus comprising:
    a data storage unit; and
    a changer having a predetermined perimeter width across a predetermined rotational plane, said predetermined perimeter width of said cartridge changer defining an allowable range of travel for moving components within said changer and not exceeding a predetermined clearance width of said data storage unit, said cartridge changer comprising:
        a recorder/reproducer cartridge tape drive for driving a magnetic tape cartridge containing a tape as a recording medium;
        a rack for storing a plurality of cartridges, and having a first and a second rack in predetermined rack positions with respect to each other and arranged in two rows one in front of the other and storing cartridges opposite to each other, respectively, such that at least one distance extending across said first and second racks in said predetermined rotational plane and through a rotational axis of said rack while said first and second rack are in said predetermined rack positions is greater than said predetermined clearance width, said first and second racks being capable of turning about a predetermined rotational axis within a predetermined rotational plane and shifting out of said predetermined rack positions with respect to each other in a direction parallel to a diameter defined in said predetermined rotational plane and through said rotational axis; and
        a rotator for rotating and shifting said first and second racks with respect to each other and out of said predetermined rack positions in said predetermined rotational plane, so as to exchange said position of said first and second racks within said rotational plane without exceeding a predetermined perimeter width of said cartridge changer.

65. An apparatus as claimed in claim 64, wherein said shifting is more specifically linear displacement of said first and second racks, and wherein an amount of linear displacement of said first and second racks at any given point of rotation is dependent on an amount of angular displacement of said rack from a predetermined position.

66. An apparatus according to claim 65, wherein respective linear displacements $X(\theta)$ of said first and second racks are expressed by:

$$X(\theta) = -X(180° - \theta)$$

$$X(\theta) = X(180° + \theta)$$

where $\theta$ is the angular displacement of the rack.

67. An apparatus according to claim 65, wherein respective linear displacements $X(\theta)$ of said first and second racks are expressed by:

$$X(\theta) = A \sin(2\theta)$$

where $\theta$ is an angular displacement of the rack, and A is a constant.

68. An apparatus as claimed in claim 64, wherein:
    said apparatus has a bay for installation of said data storage unit, said bay having a predetermined bay width of one of substantially 146 mm and substantially 101.6 mm;
    a width of said data storage unit is equal to a predetermined width within one of a range of 124 mm–146 mm and 86 mm–101.6 mm; and
    said cartridges more specifically have one of a size of: a cartridge width of 66.2 mm (±0.21), length of 48 mm (±0.3), and height of 12.2 mm (±0.2); and a cartridge width of 95.0 mm (±0.2), length of 62.5 mm (±0.3), and height of 15.0 mm (±0.2).

69. An apparatus as claimed in claim 68, wherein said apparatus is more specifically a computer apparatus, said data storage unit is more specifically a magnetic tape backup unit, and said cartridges more specifically store computer data.

70. An apparatus as claimed in claim 64, wherein said rotator more specifically provides shifting of said first and second racks equally and oppositely within said rotational plane, such equal and opposite shifting being with respect to said rotational axis of said rack.

71. An apparatus as claimed in claim 70, wherein said rotator comprises at least one component selected from a group of a gear, roller, pinion, cam, spring, groove, motor and controller to provide such equal and opposite shifting of said first and second racks.

72. An apparatus as claimed in claim 71, wherein said rotator more specifically comprises:
- a fixed gear disposed aligned with said rotational axis of said rack;
- at least one rotating pinion having a number of teeth which is ½ that of a number of teeth of said fixed gear, said at least one rotating pinion being in engagement with said fixed gear such that said at least one rotating pinion rotates and revolves around said rotational axis when said rack is rotated;
- connection means for causing said first and second racks to shift responsive to rotation of said at least one rotating pinion.

73. An apparatus as claimed in claim 71, wherein said rotator more specifically comprises:
- a fixed roller disposed aligned with said rotational axis of said rack;
- at least one rotating pinion wherein if $d_1$ is a diameter of said fixed roller and $d_2$ is a diameter of said at least one rotating pinion, then diameters of said fixed roller and said at least one rotating pinion are set according to a formula of $d_1=2 \times d_2$, and wherein said at least one rotating pinion being in engagement with said fixed roller such that said at least one rotating pinion rotates and revolves around said rotational axis when said rack is rotated;
- connection means for causing said first and second racks to shift responsive to rotation of said at least one rotating pinion.

74. An apparatus as claimed in claim 64, further comprising:
- a conveyor retrieving/returning a selected cartridge from/to said rack, and conveying said selected cartridge, said selected cartridge being one of said plurality of cartridges; and
- wherein said recorder/reproducer cartridge tape drive receiving/surrendering said selected cartridge from/to said conveyor.

75. An apparatus as claimed in claim 74, wherein at least one of said data storage unit and said cartridge changer has a cartridge access port to allow extraction/replacement of cartridges in/out of the cartridge changer, and wherein said conveyor has a construction for extraction/replacement of cartridges in/out of the cartridge changer via said cartridge access port, with such construction allowing one of an extracting/replacing of one cartridge at a time, and an extracting/replacing of at least a portion of said rack.

76. A cartridge changer for exchanging a position of cartridges, having a predetermined width defining an allowable range of travel for moving components within said changer, comprising:
- a rack being rotatable and storing at least first and second cartridges in a predetermined rotational plane with respect to each other, wherein at least one distance extending across said first and second cartridges in predetermined positions in said predetermined rotational plane and through a rotational axis of said rack is greater than said predetermined width of said cartridge changer;
- and a rotator for rotating said rack in said predetermined rotational plane, so as to exchange a position of said first and second cartridges with respect to each other within said rotational plane without exceeding said predetermined width of said cartridge changer;
- wherein said rotator more specifically performs a combination of rotation and shifting of said first and second cartridges with respect to one another within said rotational plane;
- wherein said shifting is more specifically linear displacement of said first and second cartridges with respect to each other in a direction parallel to the opposite face of said first and second cartridges.

77. A cartridge changer as claimed in claim 76, wherein an amount of linear displacement of said first and second cartridges at any given point of rotation is dependent on an amount of angular displacement of said rack from a predetermined position.

* * * * *